(12) United States Patent
Xu et al.

(10) Patent No.: US 10,812,389 B2
(45) Date of Patent: Oct. 20, 2020

(54) OPTIMIZING NETWORK CHANNEL LOADING

(71) Applicant: Hughes Network Systems, LLC, Germantown, MD (US)

(72) Inventors: Jun Xu, Takoma Park, MD (US); Robert Torres, New Market, MD (US); John Border, Middletown, MD (US); Nagesh Javali, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 560 days.

(21) Appl. No.: 15/199,629

(22) Filed: Jun. 30, 2016

(65) Prior Publication Data
US 2018/0006949 A1   Jan. 4, 2018

(51) Int. Cl.
*H04L 12/803* (2013.01)
*H04L 12/26* (2006.01)
*H04L 12/927* (2013.01)
*H04L 12/911* (2013.01)

(52) U.S. Cl.
CPC ........ *H04L 47/125* (2013.01); *H04L 43/0882* (2013.01); *H04L 43/16* (2013.01); *H04L 47/743* (2013.01); *H04L 47/805* (2013.01)

(58) Field of Classification Search
CPC ... H04L 43/0882; H04L 43/16; H04L 47/125; H04L 47/743; H04L 47/805
See application file for complete search history.

(56) References Cited

U.S. PATENT DOCUMENTS

| | | | | |
|---|---|---|---|---|
| 6,157,833 A | * | 12/2000 | Lawson-Jenkins | ... H04W 60/04 455/432.1 |
| 8,190,740 B2 | * | 5/2012 | Stienhans | ............. G06F 9/5083 709/224 |
| 2005/0213507 A1 | * | 9/2005 | Banerjee | ............. H04L 41/0806 370/241 |
| 2006/0128394 A1 | * | 6/2006 | Turina | ................... H04W 16/06 455/453 |
| 2008/0101243 A1 | * | 5/2008 | Fukui | ..................... H04W 28/08 370/238 |
| 2008/0117884 A1 | * | 5/2008 | Ishii | ....................... H04W 12/06 370/338 |
| 2013/0303114 A1 | * | 11/2013 | Ahmad | ................. H04W 16/14 455/406 |
| 2014/0344451 A1 | * | 11/2014 | Luft | ........................ H04W 4/70 709/224 |
| 2015/0207695 A1 | * | 7/2015 | Varney | ................. H05K 999/99 709/223 |

(Continued)

*Primary Examiner* — Rhonda L Murphy
(74) *Attorney, Agent, or Firm* — Bejin Bieneman PLC

(57) ABSTRACT

A terminal device in a first network includes a processor programmed to receive first data indicating a respective first loading of each of a plurality of first level access devices. The processor is further programmed to select a first level access device based at least in part on the first data; and communicate with a second network via the selected first level access device and a selected second level access device. Each of the first level access devices is switchable to communicate with the first terminal via at least a respective one of one or more shared access channels, and each of a plurality second level access devices is switchable to communicatively couple one or more of the plurality of first level access devices with a second network.

26 Claims, 10 Drawing Sheets

(56) References Cited

U.S. PATENT DOCUMENTS

2015/0257069 A1* 9/2015 Kuroki .................. H04W 36/22
370/221
2015/0373641 A1* 12/2015 Yamana ............ H04W 52/0206
370/328
2017/0207947 A1* 7/2017 Marom ................. H04L 41/046

* cited by examiner

OPTIMIZING NETWORK CHANNEL LOADING

BACKGROUND

Users of network systems may connect via multiple shared access network channels. User terminals may be distributed across network channels and gateways in order to balance load conditions for these resources. However, due to varying usage patterns of the users, resources that are out of service, etc., the load distribution may be uneven at any given time. This may result in less than optimal use of the network, and the possibility that the service of particular users is degraded.

DRAWINGS

DETAILED DESCRIPTION

Exemplary System

Figure 1:
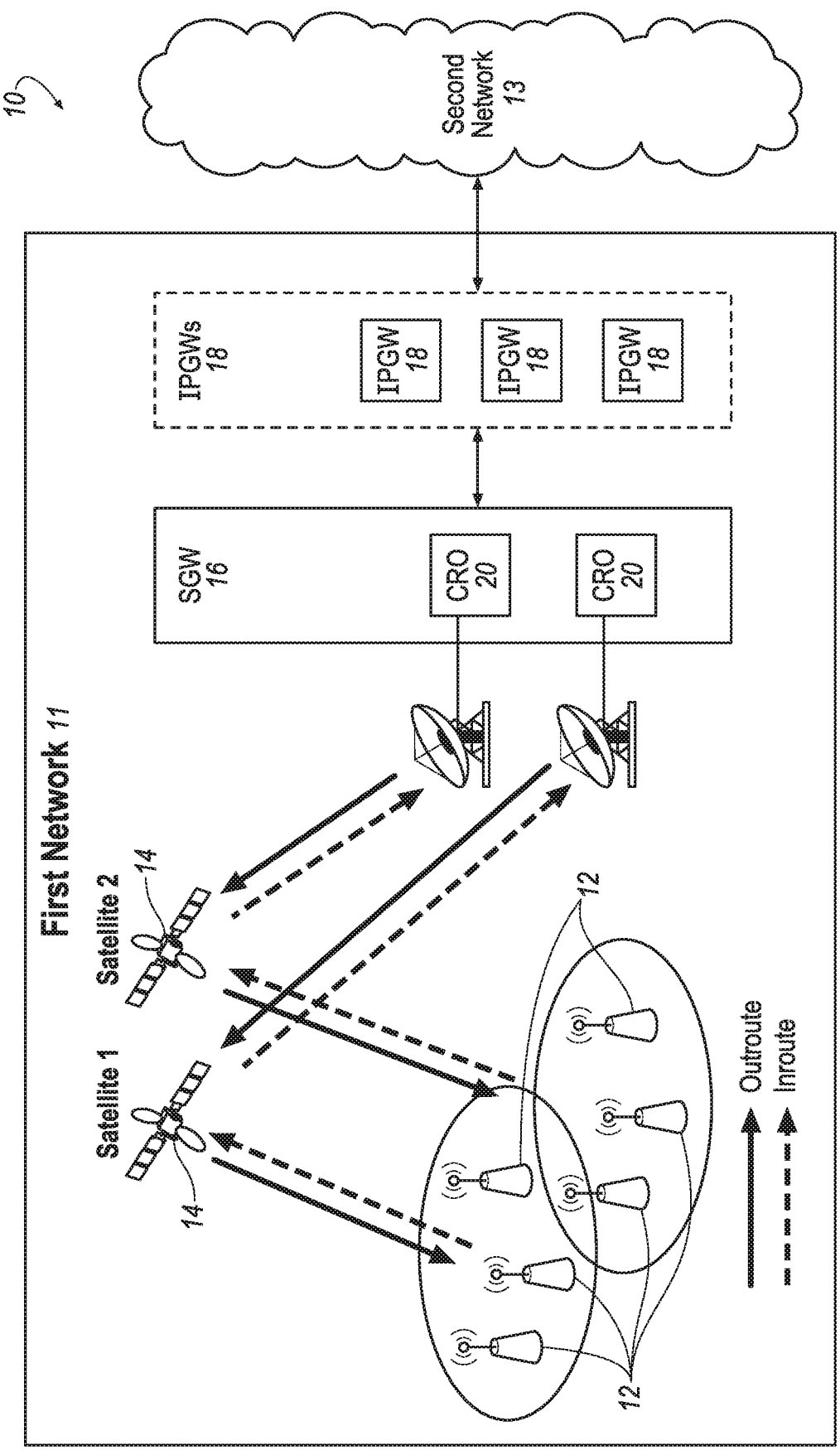
FIG. 1 is a diagram of an exemplary system for optimizing network channel loading.

Referring to FIG. 1, a system 10 includes a first network 11 and a second network 13. The first network includes one or more terminals 12, one or more satellites 14, one or more Satellite Gateways (SGWs) 16 and one or more IP Gateways (IPGWs) 18. The SGW 16 includes one or more Code Rate Organizers (CROs) 20, and transmits data to, and receives data from, the terminals 12 via the satellite 14. Communications from the SGW 16 to the terminals 12 are transmitted over one or more outroute channels 22. Communications from the terminals 12 to the SGW 16 are transmitted over one or more inroute channels 24.

As used herein, a network is a collection of communication devices linked via wired and/or wireless communications mechanisms, such that communications between the communication devices is enabled. The communication devices use circuit switching, message switching or packet switching to pass signals through correct communications mechanisms to reach correct communications devices.

As described in detail below, the terminals 12, the CROs 20 and the IPGWs 18 are each programmed to determine metrics indicating load distribution and other operating parameters of the first network 11. Based on the determined operating parameters, the terminals 12, CROs 20 and IPGWs 18 are programmed to switch terminals 12 between IPGWs 18 and additionally to switch terminals 12 between CROs 20.

This document sometimes refers to the first network 11 being programmable, or programmed, e.g., to perform a particular algorithm. Referring to the first network 11 as being programmable or programmed refers to the programmable devices within the first network 11, such as the terminals 12, the SGWs 16, the IPGWs 18, the CROS 20, etc. being programmable or programmed such that they cooperatively execute distributed computing operations, such as one of the algorithms described below.

As will be discussed in additional detail below, switching terminals 12 between transmission channels is accomplished by switching the terminals 12 between CROs 20. In the discussion below, switching a terminal 12 from one CRO 20 to another CRO 20 can be understood to include switching the terminal 12 from one outroute channel 22 to another. Note that while the discussion below addresses optimizing communications in a forward direction, i.e., from the second network 13 to the terminals 12, the concepts apply also to communications in a return direction, i.e., from the terminals 12 to the second network 13.

Adjusting the load distribution brings the following benefits to the first network 11:

1) the spectrum utilization on multiple outroute streams 22 at the beam or multi-beam level can be improved, particularly when some outroute steams 22 are busy and some not;
2) the utilization of IP gateway servers 18 is also improved particularly when an outroute 22 stream can support multiple IPGWs 18;
3) the Quality of Service (QoS), in terms of latency and throughput of individual terminals 12, can be fairly provisioned across the first network 11;
4) the first network 11 is able to move a terminal 12 from one outroute stream 22 (transmission channel) to another without disrupting the network gateway connection, facilitating features such as mobility, load balancing, etc.;
5) automatic load balancing can be achieved even in extreme cases such as adding or removing spectrum (i.e., outroute streams 22), IPGWs 18 as well as failure of an IPGW 18 or outroute 22;
6) better statistical multiplexing performance as individual access channels are virtually combined.

As noted above, this disclosure discusses adjusting the loading for outroutes 22 (forward direction channels). However, the concepts presented herein equally apply to inroutes 24 (return direction channels).

Additionally, the concepts presented herein apply to any network wherein the overall network is partitioned into multiple resource pools and each resource pool consists of multiple wireless or wired shared access channels and network traffic management gateways with both having limited throughput.

For example, a generalized system may include two or more first level access devices (e.g., the CROs 20 of system 10) which are switchable to communicatively couple one or more terminals 12 with two or more second level devices (e.g. the IPGWs 18 of system 10). The two or more second level devices may be switchable to communicatively couple the second network 13 with the two or more first level access devices. The two or more first level access devices may communicate with the one or more terminals 12 via one or more shared access channels.

Each first level access devices may communicate with the one or more terminals 12 via a respective single shared access channel. Alternatively, anyone of the one or more first level access devices may communicate with the one or more terminals 12 via more than one shared access channel.

A second level access device may be communicatively coupled with two or more first level access devices simultaneously. Further, a first level access device may be communicatively coupled with two or more second level access devices simultaneously.

Still further, a first one of the two or more first level access devices may be sourced by a first one of the two or more second level access devices and not be a second one of the two or more second level access devices, and a second one of the two or more first level access devices may be sourced by the second one of the two or more second level access devices, and not by the first one of the two or more second level access devices.

The first level access device is defined herein to be a computing device and/or software component of a computing device programmed to organize data for transmission over a shared physical wired and/or wireless data transmission channel in order to manage the use of data transmission channel resources (e.g., available frequency spectrum).

The second level access device is defined herein to be a computing device and/or a software component of a computing device programmed to receive multiple data transmissions addressed for multiple destination computing devices (e.g., the terminals 12) from a network and/or other computing device, and prepare the received data for transmission via the first level access devices to the destination computing devices. Preparing the received data includes, e.g., queueing, scheduling, and/or encoding of the received data.

System Elements

The second network 13 may be, for example a wired or wireless network such as the Internet. The second network 13 may include multiple computing devices such servers hosting websites, cloud utilities, media services, etc.

The terminal 12 is a computing device including a memory and a processor, the processor programmed to execute programs stored by the memory. The terminal 12 is programmed to receive data from the satellite 14 and provide the data, for example via an interface associated with the terminal 12, to the user. Further, the terminal 12 may be programmed to receive data from the user and transmit the data to the satellite 14. The data may be received, e.g., from an interface associated with the terminal 12. Alternatively or additionally, the data may be received from a user device, for example a mobile telephone, laptop computer, etc., communicatively coupled with the terminal 12.

The satellite 14 includes a radio frequency relay station, such as is known. The satellite 14 receives radio frequency signals from the one or more terminals 12 and relays the radio frequency signals to the SGW 16. The satellite 14 further receives radio frequency signals from the SGW 16 and relays them to the one or more terminals 12.

The satellite 14 transmits transmission signals to the terminals 12 in one or more transmission beams. A transmission beam as that term is used herein is a concentrated stream of radio waves, and is designed to provide a high gain in a specific geographic area, often referred to as a beam center. Each transmission beam includes one or more transmission channels. The transmission channels are sometimes referred as streams or data streams herein. Further, transmission channels, both from the CRO 20 to the satellite 14, and from the satellite 14 to the terminals 12, are sometimes referred to herein as outroute channels 22.

The SGW 16 is a computing device and may include one or more servers which are communicatively coupled. The SGW 16 is programmed, together with the IPGWs 18, to receive data from data the second network 13 and transmit the data to the terminals 12.

Each SGW 16 includes one or more Code Rate Organizers (CROs) 20. A CRO 20 is a software component that organizes data transmission to access a certain radio resource based on the respective modulation and coding rate such that the spectrum utilization can be optimized. The CRO 20 dynamically estimates the bandwidth capacity in terms of data rate and organizes the incoming data from IPGWs 18 into a multiplexed data stream so as to fully utilize the spectrum bandwidth for transmission. The multiplexed data stream is broadcast to terminals 12 associated with the CRO 20 while a terminal 12 receives all data in the data stream but only accesses its own part via specific addressing.

Each CRO 20 is associated with one or more outroute channels 22. As described in detail below, in order to improve the distribution of loads between outroute channels 22, terminals 12 may be switched between CROs 20. Switching a terminal 12 from one a first CRO 20 to a second CRO 20 can be understood to switch the terminal 12 from a first outroute channel 22 associated with the first CRO 20 to a second outroute channel associated with the second CRO 20.

The IP Gateway (IPGW) 18 receives data from the second network 13, and queues and schedules the data packets for multiple remote terminals 12. The scheduled packets are forwarded to the multiplexing queues at the CROs 20.

One or more resource pools 30 (FIG. 2) may be defined within each first network 11. Each resource pool 30 includes one or more IPGWs 18 and one or more CROs 20. Terminals 12 can be switched from one IPGW 18 to another IPGW 18 within a resource pool 30, and also from one CRO 20 to another CRO 20 within the resource pool 30.

The bandwidth manager 21 is a software component, and may be included, for example, in a server communicatively coupled to the SGW 16. As described in additional detail below, the bandwidth manager 21 is programmed to adjust loads within a resource pool 30 such that the loading is more evenly distributed between the outroute channels 22. The bandwidth manager 21 adjusts loads by selecting the IPGW 18 and CRO 20 to which a terminal 12 is assigned. A terminal 12 can only be assigned to one IPGW 18 and one CRO 20 at a given time. Further, a terminal 12 can only be switched between IPGWs 18 and CROs 20 within a particular resource pool 30.

Figure 2:
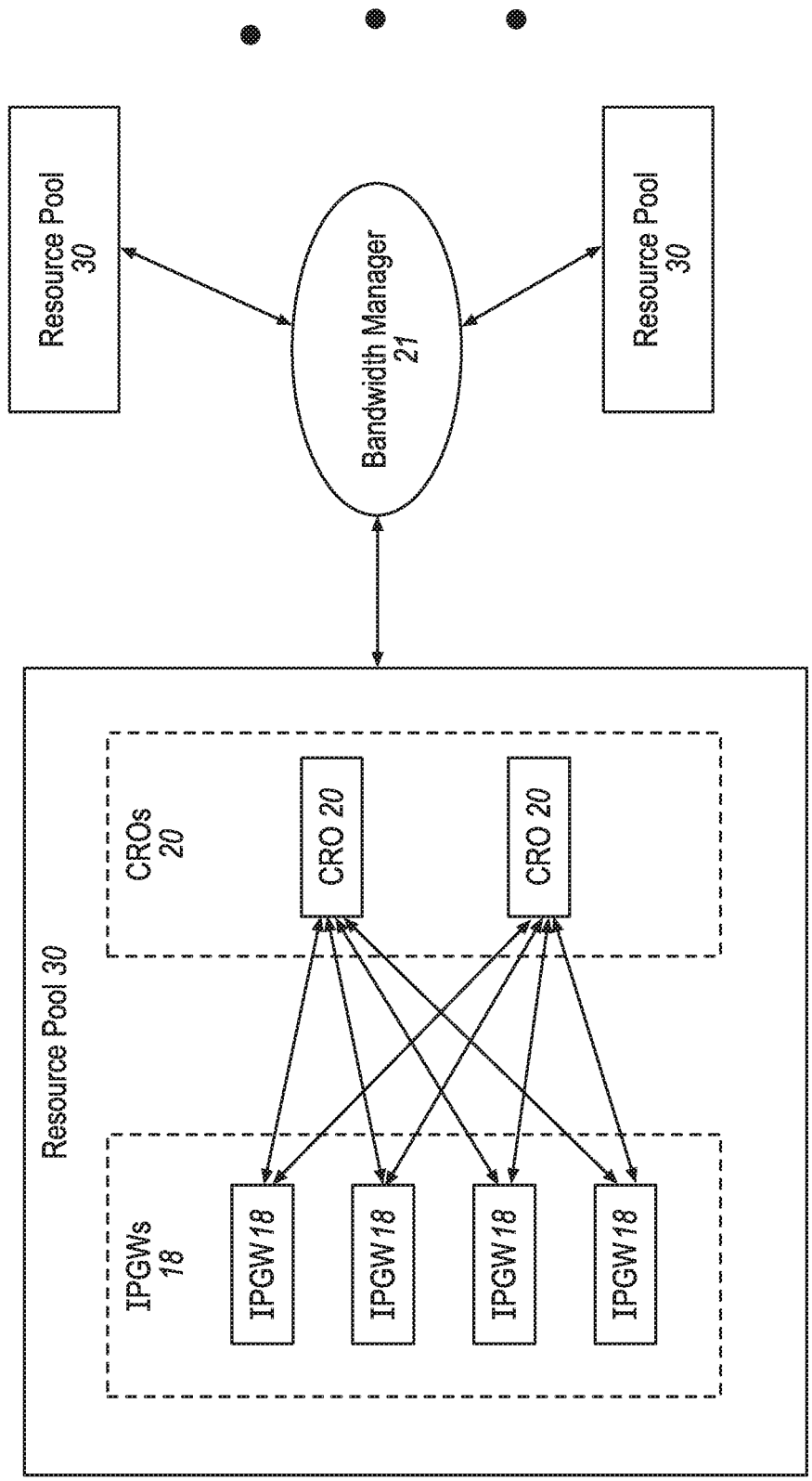
FIG. 2 illustrates an exemplary system for switching IPGWs between two or more CROs for optimizing network channel loading.

FIG. 2 illustrates a Multi-IPGW Multi-CRO model (MIMC model) for adjusting loads in a network such as the first network 11. According to the MIMC model, each of the IPGWs 18 within a resource pool 30 is switchably connectable to one or more of the CROs 20 within the resource pool 30. Similarly, each CRO 20 is switchably connectable to one or more of the IPGWs 18 within the resource pool 30.

As described above, the bandwidth manager 21 adjusts loads within the resource pool 30 by assigning terminals 12 to IPGWs 18 and CROs 20. The bandwidth manager 21 may manage multiple resource pools 30. However, the bandwidth manager 21 can only switch a terminal between IPGWs 18 and CROs 20 within a particular resource pool 30.

In some cases, the terminals 12 may perform load balancing, with assistance from other computing devices such as the CROs 20, the IPGWs 18, and the bandwidth manager 21. This is referred to herein as Network Assisted Load Balancing. Each terminal 12 operates in a distributed way or with the assistance of other computing devices (e.g., IPGWs 18, CROs 20, and/or bandwidth managers 21) within the first network 11.

Network 11 assisted Load Balancing is initiated by the terminal 12 when the terminal 12 is idle, i.e., has not transmitting for a period of time. The period of time may be a fixed time, for example ten minutes, or it may be a time which depends on other factors such as the type of the terminal 12, the time of day, a geographic location of the terminal 12, etc.

In other cases, the first network 11, i.e., one of the computing devices associated with the first network 11 such as the CROs 20, the IPGWs 18 and the bandwidth manager 21, are programmed to initiate an outroute 22 move. This is referred to herein as a Network Initiated Outroute Move. This type of load balancing occurs with active terminals 12, i.e., with terminals 12 that are transmitting, or at a break in a transmission.

During periods of first network 11 congestion, the two methods will work simultaneously. During periods of non-congestion, the Network Initiated method is not triggered.

Because of hardware limitations, some terminals 12 may need a longer time, on the order of one or more seconds, to complete a transition from one outroute 22 to another. This transition time may not be suitable for an active terminal 12 with on-going traffic. In other cases, terminals 12 may be able to acquire a new outroute 22 much faster, on the order of milliseconds, and then it would be possible to conduct fast load balancing when the terminals 12 are active. In either case, however, moving terminals 12 during their idle time would be appropriate. Moving terminals 12 from one outroute 22 to another outroute 22 during their idle time may not lead to immediate load change to an outroute 22, but when the moved terminals 12 become active, the effect of load balancing may appear. Such an approach can also be referred to as distributed method as the terminal 12 autonomously chooses an outroute CRO 20.

In case of a traffic load which is unbalanced beyond a predetermined threshold (or violates a set of pre-defined conditions), among CROs 20, the IPGW 18 may initiate a CRO 20 change for active terminals 12 with a certain backlog, for example a backlog above a predetermined threshold. The IPGW 18 may initiate the change even though the change could cause disruption to communications with the satellite 14. The IPGW 18 initiated approach is intended for active terminals 12 (likely with backlog) and may be referred to herein as a centralized method.

In addition to performing load balancing based on the load at the CROs 20 and IPGWs 18, load balancing may be performed based on the connection of per IPGW 18 per CRO 20. The parameter per IPGW 18 per CRO 20 measures the utilization network utilization in terms of the utilization individual pairs of one IPGW 18 and one CRO 20, i.e., what portion of the network utilization is attributable to the pair of the one IPGW 18 and one CRO 20. Accordingly, the distributed approach may include a combined CRO 20/IPGW 18 selection scheme.

The Bandwidth manager 21 works together with the CROs 20 and IPGWs 18 in generating needed load metrics and conducting load balancing on the CROs 20 and IPGWs 18.

In the distributed approach, a computing device such as an IPGW 18, bandwidth manager 21 and/or CRO 20 included in the first network 11, derives a set of load metrics based on load conditions of CROs 20 and IPGWs 16, which are converted to a set of probabilities, so that the terminals 12 can probabilistically select an outroute CRO 20 based on the probabilities. In the case that the overall average CRO 20 utilization is lower than a threshold (for example, 95%, meaning CRO congestion), the terminal 12 uses a weighted approach to jointly select a CRO 20/IPGW 18 combination; otherwise, the terminal 12 uses the network's 11 assisted information (provided by, e.g., the bandwidth manager 21) to select the CRO 20 and IPGW 18. If the bandwidth manager 21 is not present, the terminal 12 adjusts the network 11 loading in a purely distributed manner, ignoring the overall CRO 20 utilization.

In the centralized approach, the first network 11 directly switches the CRO 20 for an active terminal 12 with backlog (on the outroute 22 direction), such that this move would lead to immediate change to the load condition and possibly impact the user experience. According to this approach, the bandwidth manager 21 calculates the number of terminals 12 that need to be switched from one CRO 20 to another CRO 20. Based on instructions from the bandwidth manager 21, the IPGWs 18 conduct CRO 20 moves for the individual terminals 12.

The former, i.e., the distributed approach, may involve both CRO 20 and IPGW 18 moves while for the latter usually only CRO 20 moves are needed and the IPGW 18 association for the respective terminals 12 is maintained.

Table 1 lists three algorithms proposed for performing CRO 20/IPGW 18 load balancing.

TABLE 1

Load Balancing Algorithms

| ALG No. | Name | Operating Entity | Category | CRO 20/IPGW 18 Move | Comment |
|---|---|---|---|---|---|
| ALG 01 | Combined CRO 20/IPGW 18 Selection and Load Balancing | Terminal 12 | Network Assist/ Distributed | Can be both | Terminal 12 autonomously selecting IPGW 18/CRO 20 combo when idle. |
| ALG 02 | CRO 20 Load Balancing During Congestion | Bandwidth manager 21 | Network Assist/Distributed | Can be both | Terminal 12 following CRO 20 move indication from the Bandwidth manager 21 when idle. |
| ALG 03 | CRO 20 Load Balancing for Active Terminals 12 | Bandwidth manager 21/ IPGW 18 | Network Initiated/Centralized | CRO move, IPGW 18 intact. | IPGW 18 conducting terminals' CRO 20 move; for active terminals 12 with backlogs. |

Load Metrics

CRO 20 Load Density

The Load metrics defined here facilitate dynamic load balancing of CROs 20 during CRO 20 congestion or near congestion. These metrics are defined at the level of the CRO 20. Note for a single symbol rate outroute 22, there can be one or multiple CROs 20 sharing the same symbol rate. For this reason the load metric is defined at the level of the CRO 20.

The CRO 20 load ratio $r_{Load}$ is defined according to equation 1.

$$r_{Load} = \frac{\text{Total Reported Backlog (kbps)}}{CRO20 \text{ Estimated } NRT \text{ Capacity (kbps)}} \quad \text{Eqn. 1}$$

For the numerator, the total reported backlog is the summation of the reported backlog with the CRO 20 (across priorities) from all terminals 12. For the denominator, it is the CRO 20 estimated non-real-time (NRT) capacity. The CRO 20 load ratio is calculated per bandwidth allocation period and averaged based on a configured smoothing factor. That is $$E[r_{Load}](t) = \alpha \cdot r_{Load}(t) + (1-\alpha) E[r_{Load}](t-1). \quad \text{Eqn. 2}$$

$\alpha$ is a configurable parameter with default $\alpha=0.001$. When $t=1$, $E[r_{Load}](t) = r_{Load}(t)$.

The CRO total active plan rate ratio is defined according to equation 3:

$$\psi_{active} = \frac{\text{Sum of weighted rate plan of active terminals 12(kbps)}}{CRO \text{ Estimated } NRT \text{ Capacity(kbps)}} \quad \text{Eqn. 3}$$

In the existing system, the IPGW 18 reports both backlog and total weighted plan rate of active terminals 12. (An active terminal 12 means a terminal 12 with backlog.) The reported total plan rate of active terminals 12 is a weighted sum of rate plans of terminals 12.

The total plan rate ratio is defined in equation 4.

$$\Omega_{total} = \frac{\text{Sum of rate plan(weighted) of all terminals 12(kbps)}}{CRO \text{ Estimated } NRT \text{ Capacity(kbps)}} \quad \text{Eqn. 4}$$

The total plan rate ratio uses the total plan rate including those terminals 12 with no backlog. It is also weighted. In the existing system, the IPGW 18 does not report the total plan rate of all terminals 12.

The smoothed values of $\psi_{active}$ and $\Omega_{total}$ can be obtained by:

$$E[\psi_{active}](t) = \alpha \cdot \psi_{active}(t) + (1-\alpha) E[\psi_{active}](t-1), \quad \text{Eqn. 5}$$

$$E[\Omega_{total}](t) = \alpha \cdot \Omega_{total}(t) + (1-\alpha) E[\Delta_{total}](t-1), \quad \text{Eqn. 6}$$

The IPGW 18 reports the summation of weighted total rate plans to the CRO 20. The total plan rate is considered instead of only the active plan rate is because the outroute move is performed for idle terminals 12 is for idle, and not for active terminals 12.

The CRO 20 calculates the above load metrics, $r_{Load}$, $\psi_{active}$ and $\Omega_{total}$. The smoothed values (moving average) are denoted as $\hat{r}_{Load}$, $\hat{\psi}_{active}$ and $\hat{\Omega}_{total}$. For simplicity, during the context hereafter, we drop the subscripts, using $r$, $\psi$, $\Omega$ to equivalently represent the smoothed load metrics.

Utilization of IPGW 18 and CRO 20

Let M be the number of CROs 20 and N the number of IPGWs 18 in a resource pool 30. A terminal 12 perceived resource pool 30 may be a subset of the system's resource pool 30, for example, M0 CROs 20 and N0 IPGWs 18.

The CRO 20 utilization is defined as the ratio of the actual CRO 20 throughput rate and the estimated overall capacity excluding overhead. Denote $u_i$ as the utilization of CRO 20# i, i=1, ..., M. The system message of CRO 20 utilization can be represented in vector format as $$U_{CRO} = [u_1, \ldots, u_M], u_i \leq 1 \quad \text{Eqn. 7}$$

The IPGW 18 utilization is defined as the ratio of the actual IPGW's 18 overall throughput rate and the IPGW 18 configured committed information rate (CIR). The OR is generally limited by the processing capability of an IPGW 18. The IPGW's 18 utilization per CRO 20 is the ratio of IPGW's 18 respective throughput rate per CRO 20 and the IPGW's 18 CIR.

The system message of overall IPGW's 18 utilization can be represented in vector form as $$U_{IPGW} = [b_1, \ldots, b_N], \quad \text{Eqn. 8}$$

where $b_j$ is the overall utilization of i-th IPGW 18, $b_j \leq 1$, $j=1, \ldots, N$.

Further, the IPGW's 18 respective utilization per CRO 20 can be represented by an M-by-N matrix as $$U_{IPGW-CRO} = \begin{bmatrix} a_{11} & \cdots & a_{1N} \\ \vdots & \ddots & \vdots \\ a_{M1} & \cdots & a_{MN} \end{bmatrix}, \quad \text{Eqn. 9}$$

where $a_{ij}$ is the utilization per IPGW 18 per CRO 20 of i-th CRO 20 and j-th IPGW 18, $a_{ij} \leq 1$, i=1, ..., j=1, ..., N. In the above, we should have $$b_j = \sum_{i=1}^{M} a_{ij},$$

$$j = 1, \ldots, N$$

The IPGW's 18 CIR is denoted as $$A_{IPGW} = [A_1, \ldots, A_N], \quad \text{Eqn. 10}$$

where $A_j$ is the CIR for IPGW # j 18, j=1, ..., N, in Mbps or kbps.

The calculation of utilization for CRO 20, IPGW 18 and per IPGW 18 per CRO 20 is as follows. Denote t the sampling time and $T_{sample}$ the sampling interval. Typical value is $T_{sample}=100$ ms or multiple of 100 ms to fit the CRO 20 bandwidth allocation interval. Denote $V_{ij}(t)$ the throughput rate (unit: Mbps) of IPGW # j to CRO # i 20, i=1, ..., M, j=1, ..., N. $V_{CRO,i}(t)$ is the throughput rate of CRO # i 20 at time t, $V_{IPGW,j}(t)$ is the throughput rate of IPGW # j 18, and $C_{CRO,i}(t)$ is the estimated CRO 20 capacity at time t, all in unit of Mbps. We have $$V_{CRO,i}(t) = \sum_{j=1}^{N} V_{ij}(t)$$

and

-continued $$V_{IPGW,j}(t) = \sum_{i=1}^{M} V_{ij}(t).$$

The CRO 20 utilization is $$u_i(t) = \min[u_{UL,ST}, V_{CRO,i}(t)/C_{CRO,i}(t)], i=1,\ldots,M. \quad \text{Eqn. 11}$$

$u_{UL,ST}$ is a configured parameter of short term upper limit with a default value, for example, of $u_{UL,ST}=1.30$.

The IPGW 18 utilization is $$b_j(t) = \min[b_{UL,ST}, V_{IPGW,j}(t)/A_{CIR,j}], j=1,\ldots,N. \quad \text{Eqn. 12}$$

$b_{UL,ST}$ is a configured parameter of short term upper limit with a default value, for example, of $b_{UL,ST}=1.30$. $V_{IPGW,j}(t)$ is the throughput of IPGW # j 18 over all connected CROs 20. $A_{CIR,j}$ is the configured IPGW 18 CIR.

The utilization of j-th IPGW 18 of i-th CRO 20 (essentially it is part of the IPGW 18 utilization) is $$a_{ij}(t) = \min[a_{UL,ST}, V_{ij}(t)/C_{CRO,i}(t)], i=1,\ldots,M,$$
$$j=1,\ldots,N. \quad \text{Eqn. 13}$$

$a_{UL,ST}$ is a configured parameter of short term upper limit with a default value, for example, of $a_{UL,ST}=1.30$. $V_{ij}(t)$ is the throughput rate of IPGW # j 18 on CRO # i 20 and $C_{CRO,i}(t)$ is the estimated CRO # i's capacity.

In a general situation, $$u_i(t) = \sum_{j=1}^{N} a_{ij}(t),$$

$$i = 1, \ldots, M.$$

(But it may not be true that $$b_j(t) = \sum_{i=1}^{M} a_{ij}(t), j = 1, \ldots, N.)$$

If needed, one can use one configuration $u_{UL,ST}$ to replace $a_{UL,ST}$ and $b_{UL,ST}$ (to save configured variables).

Further the short term utilization variables can be smoothed as $$u_{i,EMA}(t) = \alpha_{CRO} \cdot u_i(t) + (1-\alpha_{CRO}) \cdot u_{i,EMA}(t-1)$$
$$,i=1,\ldots,M; \quad \text{Eqn. 14}$$

$$b_{j,EMA}(t) = \alpha_{IPGW} \cdot b_j(t) + (1-\alpha_{IPGW}) \cdot b_{j,EMA}(t-1),$$
$$j=1,\ldots,N; \quad \text{Eqn. 15}$$

$$a_{ij,EMA}(t) = \alpha_0 \cdot a_{ij}(t) + (1-\alpha_0) \cdot a_{ij,EMA}(t-1),$$
$$i=1,\ldots,M, j=1,\ldots,N. \quad \text{Eqn. 16}$$

$\alpha_{CRO}$, $\alpha_{IPGW}$ and $\alpha_0$ are the respective smoothing factors for CRO 20, IPGW 18 and per IPGW 18 per CRO 20 utilizations. The default values may be, for example $\alpha_{CRO}=0.01$, $\alpha_{IPGW}=0.01$, and $\alpha_0=0.01$. The utilization (smoothed values) should be no more than 1 (values are bounded by 1).

Given the estimated capacity for CRO # i 20, i=1, ..., M, the smoothed values is $$C_{i,EMA}(t) = \alpha_{CRO} \cdot C_{CRO,i}(t) + (1-\alpha_{CRO}) \cdot C_{i,EMA}(t-1). \quad \text{Eqn. 17}$$

$C_{i,EMA}(t)$ is to be provided to terminals 12 for CRO 20 and IPGW 18 selection.

Note a terminal's 12 resource pool 30 may be smaller than what is included in above messages. The terminal 12 just needs to pick up a subset of the messages based on its resource pool 30. Without loss of generality, in the discussion hereafter, we still use M and N to represent the number of CROs 20 and number of IPGWs 18 in a terminal's resource pool 30.

Further, a relative per IPGW 18 per CRO 20 utilization can be defined as $$a_{ij}^{rel} = \frac{a_{ij}}{\sum_{k=1}^{N} a_{ik}}, \quad \text{Eqn. 18}$$

$$i = 1, \ldots, M,$$

$$j = 1, \ldots, N.$$

The observed bias is defined as the relative utilization per IPGW 18 per CRO 20 is less than a threshold for a certain CRO 20, i.e., $$a_{ij}^{rel} < a_{rel}, \text{ for IPGW \#j18 on CRO \# i 20,} \quad \text{Eqn. 19}$$

where the relative threshold is a configuration number which may have a default value, for example, of $a_{rel}=0.05$.

The IPGW 18 sends the total plan rate of terminals 12 for each CRO 20 with the IPGW 18 to corresponding CROs 20. The IPGW 18 further forwards the information to the bandwidth manager 21. By adding up total plan rate from each IPGW 18, a CRO's total plan rate can be obtained by the Bandwidth manager 21 and sent to the terminal 12 by the IPGW 18.

Denote $\Omega_{CRO,0}$ be the average total plan rate density, defined as $$\Omega_{CRO,0} = \sum_{k=1}^{K} R_{CRO,k} \Big/ \sum_{k=1}^{K} C_{CRO,k}, \quad \text{Eqn. 20}$$

and $\Omega_{CRO,k}$ the total plan density of CRO # k 20, defined as $$\Omega_{CRO,k} = R_{CRO,k}/C_{CRO,k}. \quad \text{Eqn. 21}$$

In the above, $C_{CRO,k}$ is the CRO # k 20's capacity, K is the number of CROs 20 in the resource pool 30.

If $\Omega_{CRO,k} \in (1 \pm \delta_{CRO,plan})^* \Omega_{CRO,0}$, then CRO # k 20 is considered as "balanced in total plan rate". $\delta_{CRO,plan}$ is a configurable parameter with a default value of, for example, $\delta_{CRO,plan}=0.30$. The range of $\delta_{CRO,plan}$ is [0, 10] with step size=0.01.

Exemplary Process Flow

Figure 3:
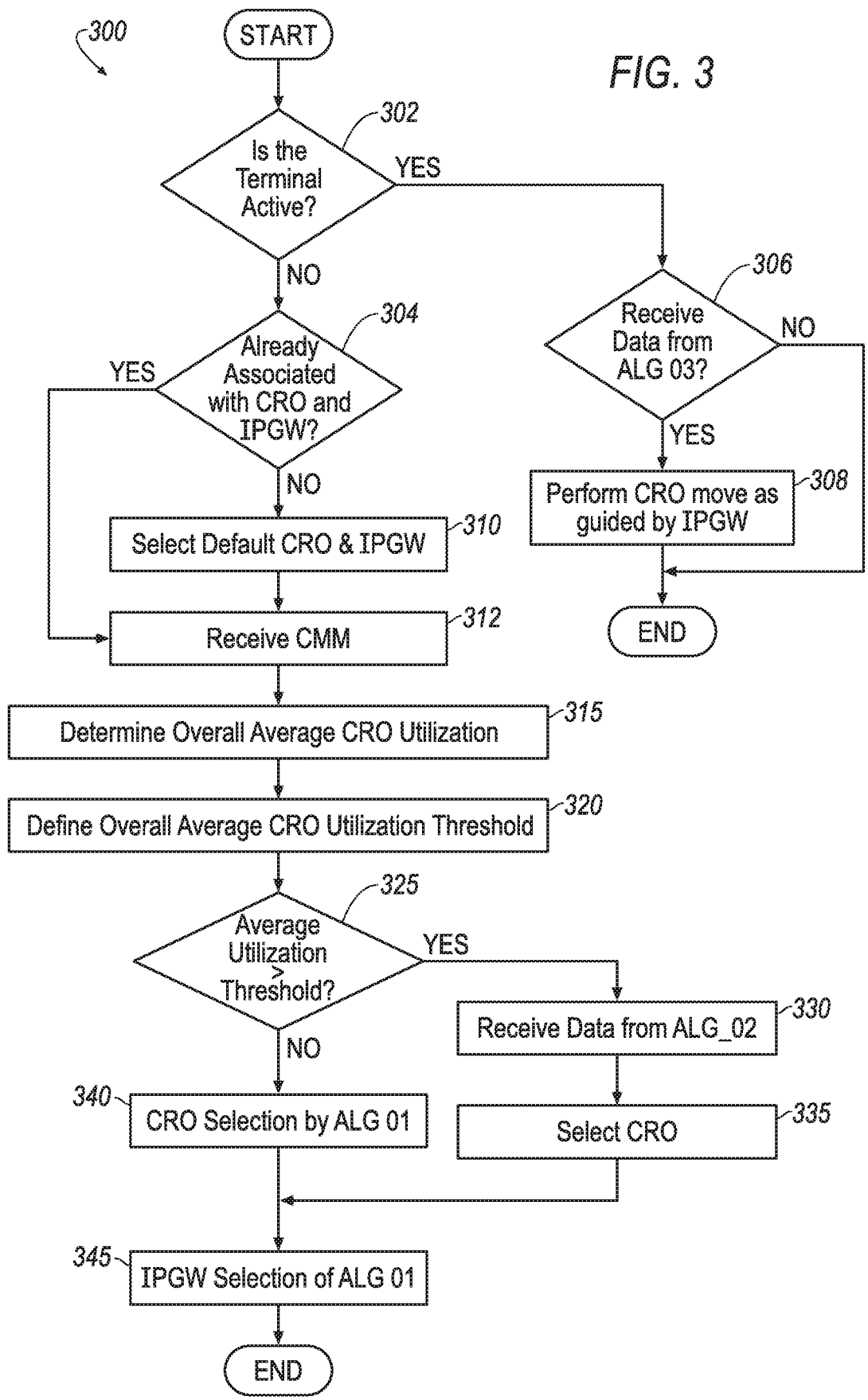
FIG. 3 is a diagram of an exemplary process for selecting an IPGW and a CRO for a terminal in a network.

FIG. 3 is a diagram of an exemplary process 300 for selecting an IPGW 18 and a CRO 20 for a terminal 12 in the first network 11. The process 300 starts in a block 302.

In the block 302, the terminal 12 determines whether the terminal 12 is active. Active may mean that the terminal 12 transmitted data within a first time period and/or the terminal 12 expects to transmit data with a second time period. Each of the first and second predetermined time periods may be fixed periods of time such as ten seconds, or ten minutes. Alternatively, each of the first and second predetermined time periods may be depend on factors such as the time of day, the type of terminal 12, the usage history of the terminal 12, etc.

In the case that the terminal 12 is determined to be active, the process 300 continues in a block 306. In the case that the terminal 12 is determined not to be active (i.e., determined to be idle), the process 300 continues in a block 304.

In the block 304, which continues from the block 302, the terminal 12 determines whether the terminal 12 is associated with an IPGW 18 and with a CRO 20. Even though the terminal 12 is already associated with the IPGW 18 and CRO 20, rebalancing when criteria are met. The process 300 continues in a block 312. Otherwise, the process continues in a block 310.

In the block 306, which follows from the block 302, the terminal 12 determines whether it receives data generated by the ALG03 (process 600 described below). In the case that the terminal 12 receives data generated by the ALG03, the process 300 continues in a block 308. Otherwise, the process 300 ends.

In the block 308, the terminal 12 performs a CRO 20 move, based on instructions received from an IPGW 18. Upon completing the CRO 20 move, the process 300 ends.

In the block 310, which follows from the block 304, the terminal 12 selects a default CRO 20 and a default IPGW 18. In some cases, the default IPGW 18 and CRO 20 may be identified in a system file in the terminal 12. In other cases, the default CRO 20 may be the previous CRO 20. Upon selecting the default CRO 20 and IPGW 18, the process 300 continues in a block 312.

In the block 312, the terminal 12 receives a Capabilities Multicast Message (CMM) from an IPGW 18. The CMM includes metrics related to loading of the CROs 20 and IPGWs 18 within the resource pool 30. Upon receiving the CMM, the process 300 continues in a block 315.

In the block 315, the terminal 12 determines the overall average CRO 20 utilization. The overall average CRO 20 utilization can be found by weighting the capacity as $$u_{AVG\text{-}CRO} = \frac{\sum_{i=1}^{M} u_{i,EMA} C_{i,EMA}}{\sum_{i=1}^{M} C_{i,EMA}}. \quad \text{Eqn. 22}$$

To simplify the notation, we drop "EMA" of $u_{i,EMA}$ and $C_{i,EMA}$ as well as $b_{j,EMA}$ and $a_{ij,EMA}$ in writing terminal's 12 algorithms. Upon determining the overall average CRO utilization, the process 300 continues in a block 320.

In the block 320 the process 300 defines an overall average CRO 20 utilization threshold $u_{CRO\text{-}TH}$. The overall average CRO 20 utilization threshold may be assigned a default value of, for example, $u_{CRO\text{-}TH}=0.95$. Upon determining the CRO 20 utilization threshold, the process 300 continues in a block 325.

In the block 325, the terminal 12 determines whether the average CRO 20 utilization is greater than or equal to the CRO 20 and no branch is abnormal. A branch being abnormal means that the data rate from an IPGW 18 to a CRO 20 is less than a pre-defined portion (e.g. 56%) of the total rate to the CRO 20. The terminal 12 determines whether:

$$u_{AVG\text{-}CRO} \geq u_{CRO\text{-}TH} \text{ and all } a_{ij}^{rel} \geq a_{rel} \quad (i=1,\ldots,M, j=1,\ldots,N). \quad \text{Eqn. 23}$$

In the case that the utilization is greater than or equal to the threshold (system is congested) and no branch is abnormal, the process 300 continues in a block 330. In the case that the average CRO 20 utilization is less than the CRO 20 utilization threshold, (system not congested), the process 300 continues in a block 340.

In the block 330, the terminal 12 receives data from ALG02. As described in detail with respect to the process 500, a computing device such as the bandwidth manager 21 or the IPGW 18 is programmed to determine possible CRO 20 moves, and instruct the terminal 12 (see blocks 518 and 520) to execute the moves. Upon receiving the instructions from ALG02, the process 300 continues in a block 335.

In the block 335, the terminal 12 selects, based on instructions received from ALG02, a CRO 20. This may result in remaining with the same CRO 20. Upon selecting a CRO 20, the process 300 continues in a block 345.

In the block 340, which follows from the block 325, the terminal 12 selects a CRO according to ALG01. This is described in blocks 402 through 412 of process 400. Upon selecting a CRO 20 according to ALG01, the process 300 continues in the block 345.

In the block 345, which may follow from the block 335 or the block 340, the process 300 selects an IPGW 18 according to ALG01. This is described in the blocks 416-438 of the process 400. Upon selecting an IPGW 18 according to ALG01, the process 300 ends.

Figure 4A:
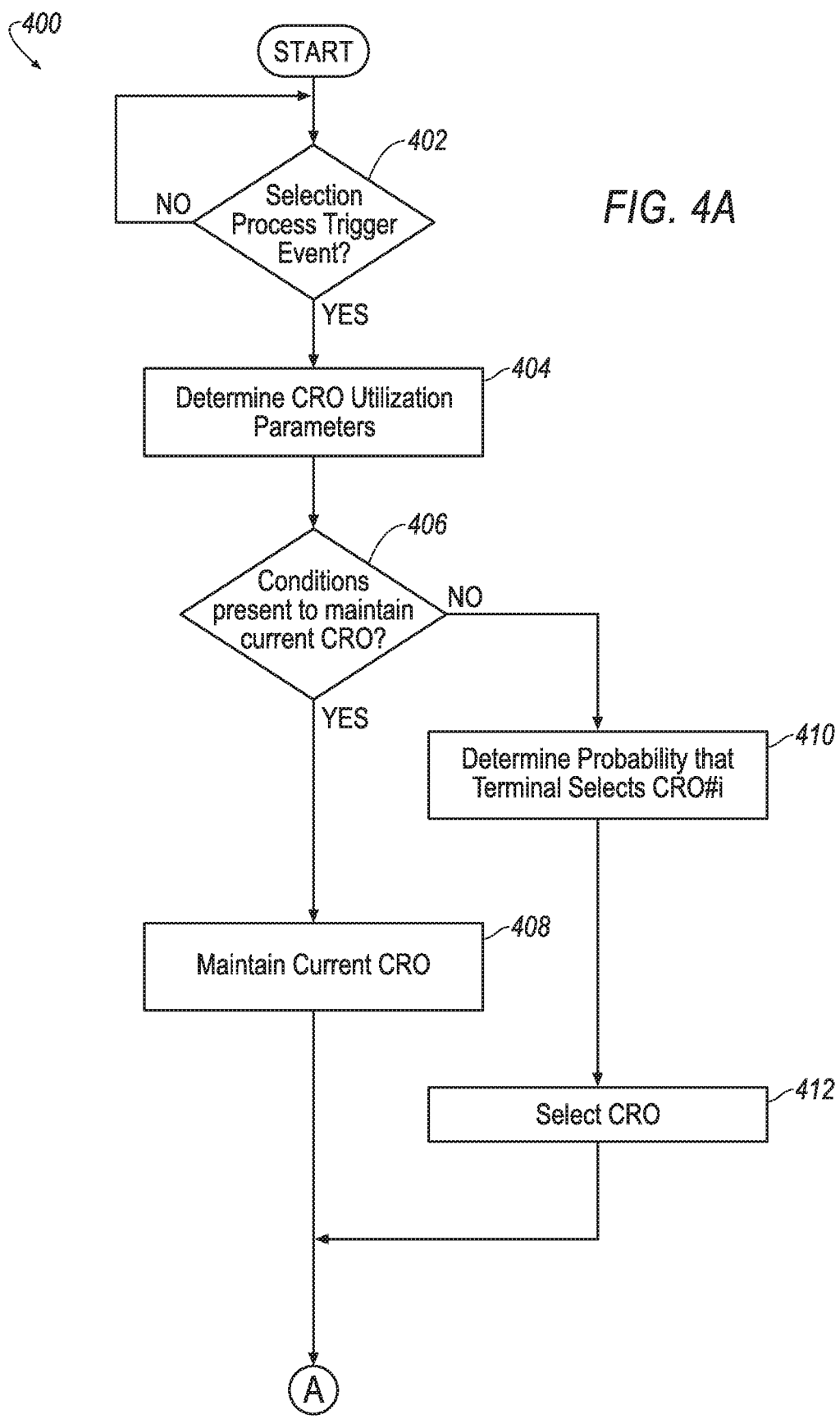
FIG. 4A is a diagram of a first portion of an exemplary process to select an IPGW and a CRO within a network.
Figure 4B:
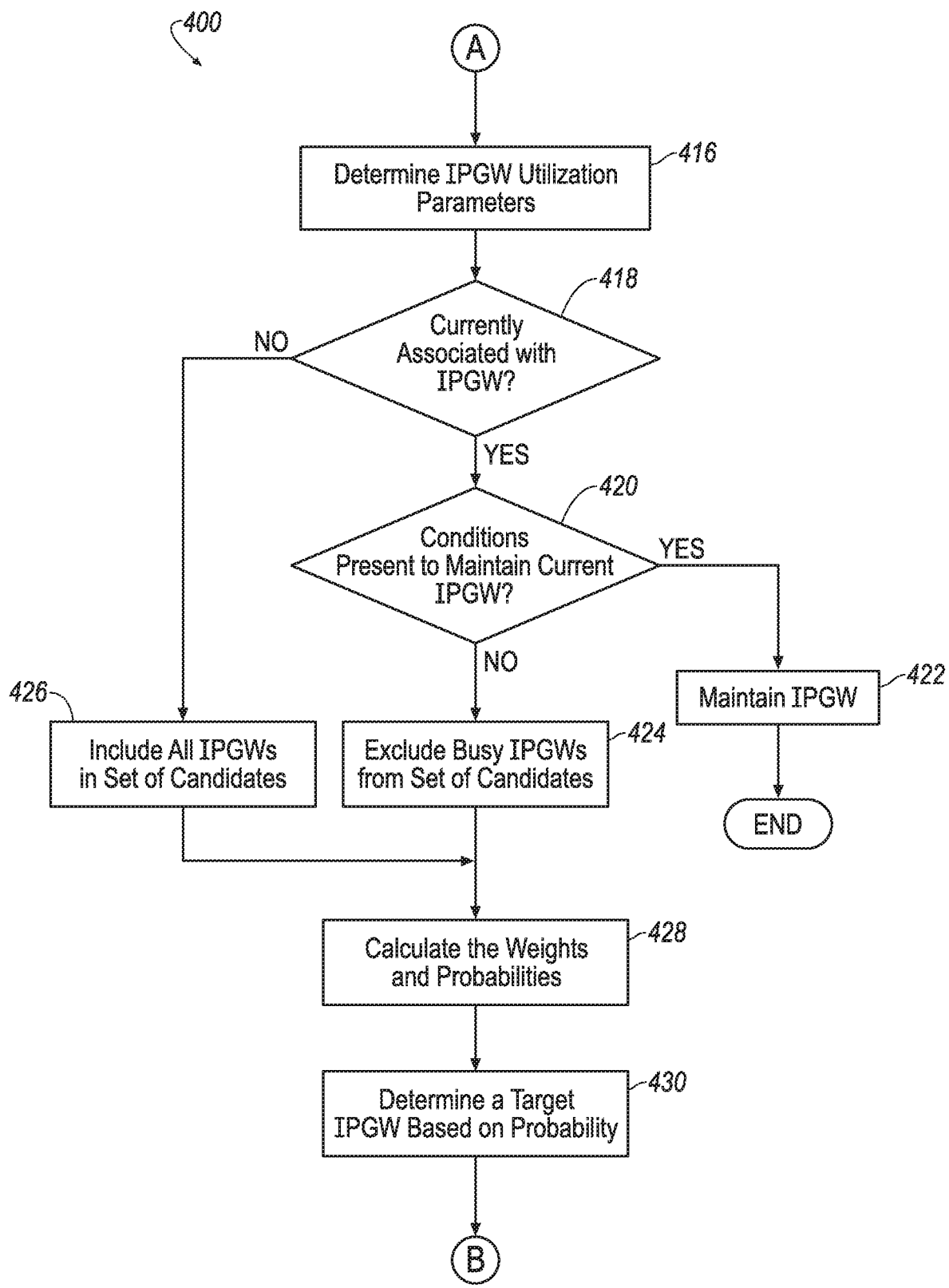
FIG. 4B is a diagram of a second portion of the exemplary process of FIG. 4A to select the IPGW and the CRO within the network.
Figure 4C:
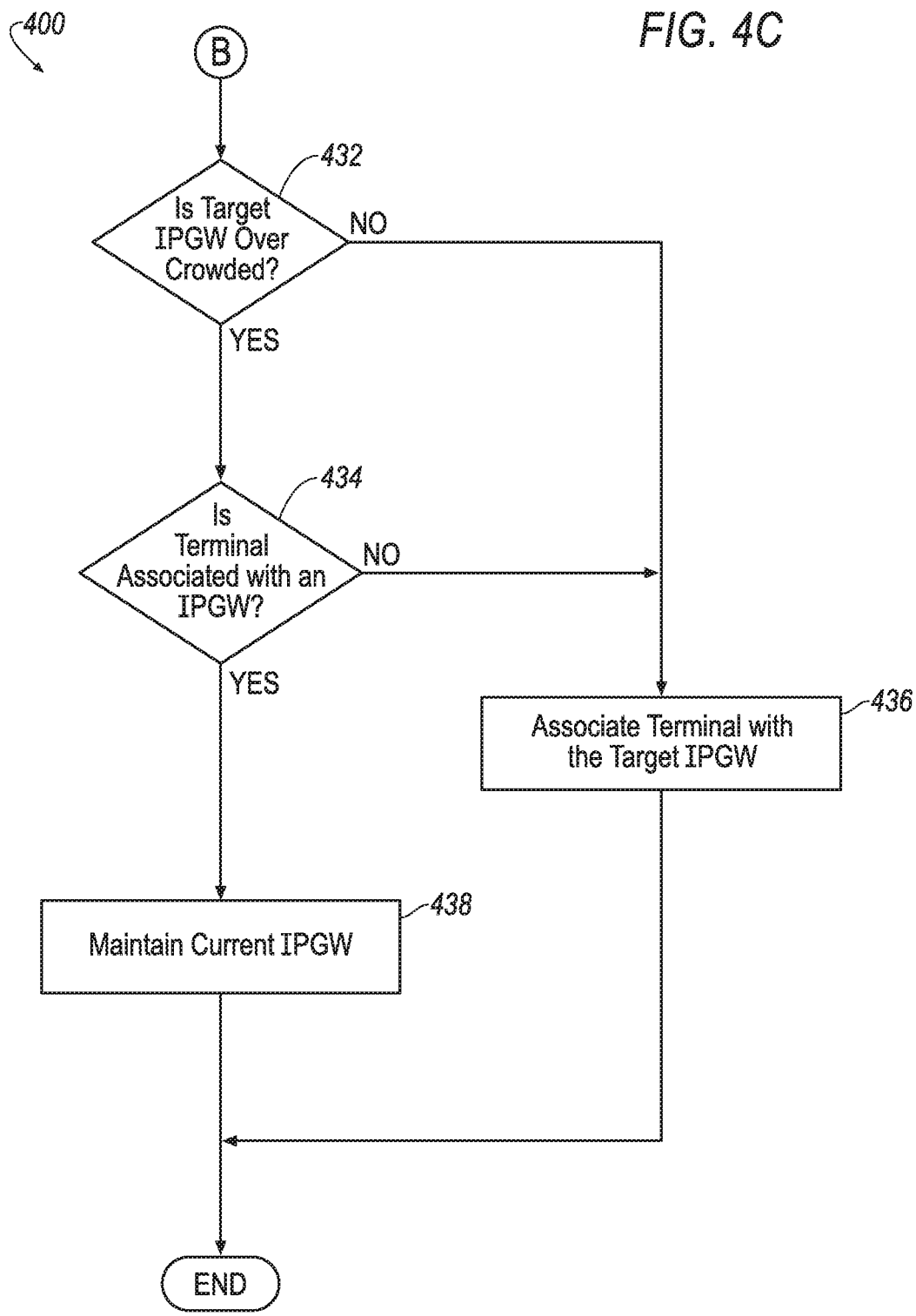
FIG. 4C is a diagram of a third portion of the exemplary process of FIGS. 4A and 4B to select the IPGW and the CRO within the network.

FIGS. 4A, 4B and 4C are respectively first, second and third portions of a diagram of an exemplary process 400 for a terminal 12 to select an IPGW 18 and CRO 20 within a first network 11. The process 400 starts in a block 402.

In the block 402, the terminal 12 determines whether a trigger event has occurred to select a CRO 20 and/or IPGW 18. A trigger event may be, for example, that an average overall CRO 20 utilization is higher than 95%. Upon identifying the trigger event to select a CRO 20 and/or IPGW 18, the process 400 continues in a block 404.

In the block 404, the terminal 12 determine the utilization of the CRO 20 with which the terminal 12 is currently associated and the overall average CRO 20 utilization. The CRO 20 utilization may be calculated based on equation 11, as described above. The overall average CRO 20 utilization can be calculated based on equation 22, as described above. Upon determining the CRO 20 utilization and the overall average CRO 20 utilization, the process 400 continues in a block 404.

In the block 406 determines whether the conditions are present to maintain the current CRO 20.

The terminal 12 determines whether $[u_i \leq u_{AVG\text{-}CRO}(1+\delta_{CRO})$ or $u_i \leq \theta_{CRO,1}]$ and $[\Omega_{CRO,k} \leq (1+\delta_{CRO,plan})*\Omega_{CRO,0}]$ (first condition).

The terminal 12 further determines whether one of the following is true (second condition):
(1). the terminal 12 is currently associated with IPGW # j 18 and IPGW's 18 utilization $b_j \leq \theta_{IPGW,1}$;
(2). the average utilization of IPGWs 18 connected with CRO # i 20, denoted as $b_{avg,CRO\,\#\,i}$, is smaller or equal to $\theta_{IPGW,1}$, i.e., $b_{avg,CRO\,\#\,i} \leq \theta_{IPGW,1}$;
(3). the average utilization of IPGWs 18 connected with CRO # i 20 is no more than the overall IPGW 18 utilization plus a margin. Denote $b_{IPGW,avg}$ the average IPGW 18 utilization of all IPGWs 18 in the resource pool 30. This condition is expressed as $b_{avg,CRO\,\#\,i} \leq (1+\delta_{IPGW}) \cdot b_{IPGW,avg}$, where $\delta_{IPGW}$ is a configurable parameter with, for example, a default value $\delta_{IPGW}=0.10$ ($\delta_{IPGW}$ is also defined and used for IPGW selection).
(4). All IPGWs' 18 utilization $b_k \geq \theta_{IPGW,2}$, $b_k$ is the utilization for individual IPGW # k 18, with, for example, $\theta_{IPGW,2}=0.85$.

For the above determinations, $u_i$ is the utilization of CRO # i 20 with which the terminal 12 is associated, and $b_j$'s are the overall utilization of a candidate IPGW # j 18 connected to CRO # i 20. $\delta_{CRO}$ is the tolerance with a default value, for example, of $\delta_{CRO}=0.05$. $\theta_{IPGW,1}$ is a threshold with a default value, for example, of $\theta_{IPGW,1}=0.70$. The reason for $\theta_{IPGW,1}$ is that a terminal 12 could move a CRO 20 for a lightly loaded IPGW 18. $\theta_{CRO,1}$ is the CRO 20 utilization threshold for non-moving with, for example, a default value of $\theta_{CRO,1}=0.75$. $\delta_{CRO,plan}=0.30$.

In the case that the first and second conditions are present, the process 400 continues in a block 408.

Otherwise, the process 400 continues in a block 410.

In the block 408, the current CRO 20 is maintained. The process continues in a block 416.

In the block 410, which follows the block 408, the terminal 12 determines a probability that the terminal 12 selects a CRO # i 20.

Denote $C_i^{(R)}$ and $A_j^{(R)}$ the residual capacity of CRO # i 20 and IPGW # j 18, respectively, i=1, ..., M, j=1, ..., N. We can obtain the following:

$$C_i^{(R)}=C_i \cdot (1-u_i), i=1, \ldots, M, \quad \text{Eqn. 24}$$

$$A_j^{(R)}=A_j \cdot (1-b_j), j=1, \ldots, N. \quad \text{Eqn. 25}$$

$S_i$ is the symbol rate or CRO i 20, $b_{0i}$ is the respective nominal spectrum efficiency, and $A_j$ is the OR for IPGW # j 18.

A margin is applied to the IPGW 18 residual capacity such that when the margin is reached, the weight of this IPGW 18 becomes extremely small, unless all IPGWs 18 reach this margin. The margin is denoted as $v_{m\text{-}IPGW}$ with a default value, for example, of $v_{m\text{-}IPGW}=0.03$.

Then the residual IPGW 18 capacity is revised as $$A_j^{(R)}=\max[a_{min\text{-}IPGW} \cdot A_j, A_j \cdot (1-v_{m\text{-}IPGW}-b_j)],$$
$$j=1, \ldots, N. \quad \text{Eqn. 26}$$

$a_{min\text{-}IPGW}$ is a configuration parameter with default value $a_{min\text{-}IPGW}=0.005$.

We denote $$A_{min}^{(R)}=a_{min\text{-}IPGW} \cdot A_j. \quad \text{Eqn. 27}$$

Similarly, the residual CRO 20 capacity can also be written as $$C_i^{(R)}=\max[a_{min\text{-}CRO} \cdot C_i, C_i \cdot (1-v_{m\text{-}CRO}-u_i)],$$
$$i=1, \ldots, M. \quad \text{Eqn. 28}$$

$C_i=S_i \cdot b_{0i}$, which is the estimated CRO 20 capacity obtained from the network. $a_{min\text{-}CRO}$ is a configuration parameter with default value, for example, of $a_{min\text{-}CRO}=0.005$. $v_{m\text{-}CRO}$ is the CRO 20 utilization margin with default value, for example, of $v_{m\text{-}CRO}=0.03$.

Let total residual capacity of IPGWs 18 with CRO # i 20 be $$A_{CRO,i}^{(R)}=\sum_{j}^{j \in CRO\#i} A_j^{(R)}. \quad \text{Eqn. 29}$$

(We use M to represent the number of CROs 20 in the terminal's 12 resource pool 30. But the total residual capacity of IPGWs 18 on CRO # i 20 is only those that are directly connected to this CRO 20.)

We next define a weight of the CRO # i 20 based on combined residual capacity of the CRO 20 and IPGWs 18, as follows.

In the case that $C_i^{(R)} \le a_{min\text{-}CRO} \cdot C_i \cdot (1+\delta_{IPGW})$, the weight of CRO 20# i is given by $W_{CRO,i}=(1-\varphi_1) \cdot C_i^{(R)}$.

This means that in the case that the CRO's 20 residual capacity is very small, its weight will not be affected by the IPGW 18.)

Otherwise, $W_{CRO,i}=\varphi_1 \cdot A_{CRO,i}^{(R)}+(1-\varphi_1) \cdot C_i^{(R)}$, i=1, ..., M, (M is the number of candidate CROs.). $\delta_{IPGW}$ and $\delta_{CRO}$ $\varphi_1$ is configured weight with a default value, for example, of $\varphi_1=0.3$ (or 0.40). $W_{CRO,i} \ne 0$.

Let $P_{CRO,i}$ be the probability that the terminal selects CRO # i 20. We have $$P_{CRO,i} = \frac{W_{CRO,i}}{\sum_{k=1}^{M} W_{CRO,k}}. \quad \text{Eqn. 30}$$

The terminal selects CRO # i 20 using probability $P_{CRO,i}$. Note $$\sum_{i=1}^{M} P_{CRO,i} = 1.$$

Such selection may result in the terminal 12 maintaining the current CRO 20.

Upon determining the probability that the terminal 12 selects CRO # i 20, the process 400 continues in a block 412.

In the block 412, the terminal selects CRO # i 20. The terminal bases the selection on the probability $P_{CRO,i}$. Note $$\sum_{i=1}^{M} P_{CRO,i} = 1.$$

The selection may result in the terminal maintaining the current CRO 20.

Upon selecting CRO # i 20 is selected for the terminal to move in, the terminal 12 further checks whether the CRO # i's 20 total plan rate is beyond balance. That is, in the case that $\Omega_{CRO,i} > (1+\delta_{CRO,plan}) * \Omega_{CRO,0}$ then CRO # i 20 is considered as "out of balanced in total plan" and the terminal 12 may cancel the move. The configuration $\delta_{CRO,plan}$ may be set to a default value, for example, $\delta_{CRO,plan}=0.3$.

To avoid frequent moves of idle terminals 12, the terminal 12 further applies a factor, $f_{CRO}$, as a probability after selecting CRO # i 20. That means, the terminal obtains CRO # i 20 based on probability $P_{CRO,i}$; further, it applies probability $f_{CRO}$ to finalize the selection. If $f_{CRO}$ misses the hit, the terminal 12 cancels the selection and maintains the current CRO 20. For example, the probability $P_{CRO,i}$ may be 0.2. A random number may be generated, and in the case that the random number is less than 0.2, the terminal 12 may make the move. Otherwise, the terminal 12 maintains the current CRO 20.

Upon selecting the CRO # i 20, the process 400 continues in a block 416.

In the block 416, the terminal 12 determines the average IPGW 18 utilization as follows.

Let $b_{IPGW\text{-}AVG}$ denote the average utilization of IPGW 18, which can be expressed as $$b_{IPGW\text{-}AVG} = \frac{\sum_{j=1}^{N} b_j A_j}{\sum_{j=1}^{N} A_j}, \quad \text{Eqn. 31}$$

where $b_j$ is the load of IPGW # j 20, $A_j$ is the CIR of IPGW # j 20, j=1, ..., N.

Upon calculating the average utilization of the IPGW 18, the process 400 continues in a block 418.

In the block 418, the terminal 12 determines whether the terminal 12 is currently associated with an IPGW. In a case #1 that the terminal 12 is associated with an IPGW 18, the process 400 continues in a block 420. In a case #2 that the terminal 12 is not associated with an IPGW 18, the process 400 continues in a block 426.

In the block 420, the terminal 12 determines whether conditions are present to maintain the current IPGW 18.

In the case that the current IPGW's 18 utilization is less than the overall average IPGW 18 utilization or all IPGW's utilization is larger than a threshold $\theta_{IPGW,2}$, then the terminal 12 stays at the current IPGW 18. The condition can be expressed as equation 32.

$$b_k \leq a_{IPGW\text{-}AVG}(1+\delta_{IPGW}) \text{ or } b_k \leq \theta_{IPGW,1} \text{ or [all}$$
$$b_j \geq \theta_{IPGW,2}(j=1, \ldots, N) \text{ and all } a_{ij}{}^{rel} > a_{rel} \text{ given}$$
$$\text{CRO } \# i] \text{ AND } \Omega_{IPGW,k} \leq (1+\theta_{IPGW,4})^* \Omega_{IPGW,0} \quad \text{Eqn. 32}$$

$\delta_{IPGW}$ is the tolerance range with default value, for example, of $\delta_{IPGW}$=0.10 and $\theta_{IPGW,2}$ is an utilization threshold indicating a busy IPGW 18 with default value, for example, of $\theta_{IPGW,2}$=0.85. Setting $\theta_{IPGW,2}$ means that if all IPGWs 18 are heavily loaded, then there is no need to switch IPGW 18. $\theta_{IPGW,1}$ is previously defined. $\theta_{IPGW,4}$ is configurable parameter with a default value, for example, of $\theta_{IPGW,4}$=0.35.

In the case that equation 32 is true, the process 400 continues in a block 422 (the terminal 12 stays at the current IPGW 18). Otherwise, the process continues in a block 424.

In the block 422, the terminal 12 maintains the current IPGW 18. Upon confirming that the terminal 12 maintains the current IPGW 18, the process 400 ends.

In the block 424, the terminal 12 identifies a set of candidate IPGWs 18 with which the terminal 12 can be associated, excluding terminals that are loaded above a predetermined threshold. This can be expressed as:

$$Z_C = Z_{IPGW\text{-}MOVE} = \{k : b_k < \theta_{IPGW,2}, k \in N\}, k \text{ is the index of a candidate.} \quad \text{Eqn. 33}$$

Upon determining the set of candidate IPGWs 18 for the terminal, the process 400 continues in the block 428.

In the block 426, the terminal 12 determines a set of candidate IPGWs 18 that includes all IPGWs 18 in the resource pool 30. This can be expressed as:

$$Z^C = Z_{IPGW\text{-}MOVE} = \{k : k \in N\}, k \text{ is the index of a candidate.} \quad \text{Eqn. 34}$$

Upon determining the set of candidate IPGWs 18 for the terminal 12, the process 400 continues in a block 428.

In the block 428, the terminal 12 calculates weights and probabilities.

As discussed above, the per IPGW 18 per CRO 20 (the CRO's 20 utilization from an IPGW 18), can be represented by an M-by-N matrix as $$U_{IPGW\text{-}CRO} = \begin{bmatrix} a_{11} & \cdots & a_{1N} \\ \vdots & \ddots & \vdots \\ a_{M1} & \cdots & a_{MN} \end{bmatrix},$$

where $a_{ij}$ is the utilization per IPGW 18 per CRO 20 of i-th CRO 20 and j-th IPGW 18, $a_{ij} \leq 1$, i=1, ..., M, j=1, ..., N. M and N are the number of CROs 18 and IPGWs 20, respectively. The utilization of CRO # i 20, i=1, ..., M, is the summation of row # i.

The terminal 12 determines the per IPGW 18 per CRO 20 according to equation 9. Upon determining the per IPGW 18 per CRO 20, a relative per IPGW 18 per CRO 20 utilization can be defined as $$a_{ij}^{rel} = \frac{a_{ij}}{\sum_{k=1}^{N} a_{ik}}, i=1, \ldots, M, j=1, \ldots, N. \quad \text{Eqn. 35}$$

An observed bias can be defined as the relative utilization per IPGW 18 per CRO 20 being less than a threshold for a certain CRO 20, i.e., $$a_{ij}^{rel} < a_{rel}, \text{ for IPGW } \#j \text{ 18 on CRO } \# i 20, \quad \text{Eqn. 36}$$

where the relative threshold is a configuration number with default value, for example, of $a_{rel}$=0.05.

In this case, the concept of residual IPGW 18 capacity is applied to derive the IPGW 18 selection probability, weighting it by using per IPGW 18 per CRO 20 load. The same margin $v_{m\text{-}IPGW}$ (default, for example, $v_{m\text{-}IPGW}$=0.03) is applied to the IPGW 18 residual capacity such that when the margin is reached, the chance of selecting this IPGW 18 is extremely small, unless all IPGWs 18 reach this margin.

Recall the residual capacity of IPGW # k 18 counting margin $v_{m\text{-}IPGW}$ is given by $$A_k^{(R)} = \max[A_{min}^{(R)}, A_k(1-v_{m\text{-}IPGW}-b_k)]k \in Z_C. \quad \text{Eqn. 37}$$

Referring to what is previously defined, $A_{min}^{(R)} = a_{min\text{-}IPGW} \cdot A_k$.

Generally ALG01 should be able to dynamically achieve load balance not only for the CRO 20 and IPGW 18 level, but also at per IPGW 18 per CRO 20 level. ALG01 basically does not trigger a CRO 20/IPGW 18 move when the CRO 20 and IPGW 18 are both balanced.

An extreme case could be that both CRO 20 and IPGW 18 utilization are balanced, but traffic load at per IPGW 18 per CRO 20 level is biased beyond a predetermined level. Such a bias may impact the CRO 20 bandwidth allocation during congestion.

The above case is addressed by giving more weight to a particular per IPGW 18 per CRO 20 link such that a terminal 12 has higher probability to choose that CRO 20-IPGW 18 pair. The terminal 12 should perform ALG01 even when the overall CRO 20 utilization is high and CRO 20/IPGW 18 utilization is balanced in the case of any per IPGW 18 per CRO 20 utilization bias (i.e., very low utilization at this branch).

The weight in deriving the probability of selecting IPGW # k 18 (given CRO # i 20) is calculated by

---

For k = any of $Z_C$
  IF $u_{AVG\text{-}CRO} \geq U_{TH,2}$ and $a_{ik}^{rel} < a_{rel}$ (given CRO#i 20 being selected)
    $W_{IPGW,k} = \beta_a \cdot A_k^{(R)}$;
  Else
    $W_{IPGW,k} = A_k^{(R)}$;
  End
End

---

In the above, $u_{AVG\text{-}CRO}$ is the overall average CRO 20 utilization, $u_{TH,2}$ is a configured utilization threshold, $\beta_a$ is a weight, and $A_k^{(R)}$ is the residual capacity. $W_{IPGW,k} \neq 0, k \in Z_C$. The default values may be, for example, $u_{TH,2}$=0.85 and $\beta_a$=3.0.

We can see that the derived weight is based on the residual capacity of an IPGW 18 adjusted by the utilization of per IPGW 18 per CRO 20. If IPGW # j's 18 load on CRO # i 20 is less than a threshold and the overall average CRO 20 utilization is higher than a configured level, this IPGW's 18 weight is boosted by $\beta_a$.

The probability of the terminal 12 selecting IPGW 18 is then given by $$P_{IPGW,k} = \frac{W_{IPGW,k}}{\sum_{j=1}^{Z_C} W_{IPGW,j}}, \qquad \text{Eqn. 38}$$

where $Z_C$ is the candidate set of IPGWs 18 connected to the CRO 20. Upon, determining the probability of the terminal 12 selecting the IPGW # k 18, the process 400 continues in a block 430.

In the block 430, the terminal 12 selects the IPGW # k 18 according to the probability determined above. Again $$\sum_{k=1}^{Z_C} P_{IPGW,k} = 1.$$

Such selection may result in the terminal 12 maintaining its association with the same IPGW 18.

Recall in Case #1 the terminal 12 is associated with an IPGW 18 and switches to another one if needed; in Case #2 the terminal 12 is not associated with an IPGW 18 and selects one.

In Case #1, when a terminal 12 finishes the selection of a new IPGW 18, it will apply a factor, $f_{IPGW}$, to slow down the move. That is, after the terminal 12 selects IPGW # k 18, and further applies a probability $f_{IPGW}$ on the selection of IPGW # k 18. If it misses the hit, the terminal 12 will cancel the selection of IPGW # k 18 and stays with the current IPGW 18.

In Case #2, since it is the first time selection, no $f_{IPGW}$ is needed.

Upon selecting an IPGW 18 for association with the terminal 12, the process continues in a block 432.

In the block 432, the process 400 determines whether the target IPGW is overcrowded. It is also important to ensure that the number of terminals 12 associated in each IPGW 18 in terms of total plan rate is not biased due to load balancing. This would require the IPGW 18 to send the total plan rate to the terminal 12.

Regarding the determination of the probability of the terminal 12 selecting IPGW 18, let $R_{IPGW,k}$ be the total plan rate of IPGW # k 18, k=1, . . . , K. K is the number of IPGWs 18 in the candidate set.

Denote $\Omega_{IPGW,0}$ be the average total plan rate density, defined as $$\Omega_{IPGW,0} = \sum_{k=1}^{Z_C} R_{IPGW,k} \bigg/ \sum_{k=1}^{Z_C} A_k, \qquad \text{Eqn. 39}$$

and $\Omega_{IPGW,k}$ the total plan density of IPGW # k 18, defined as $$\Omega_{IPGW,k} = R_{IPGW,k}/A_k. \qquad \text{Eqn. 40}$$

In above, $A_k$ is the IPGW's 18 CIR, $Z_c$ is the candidate set.

If $\Omega_{IPGW,k} > (1+\theta_{IPGW,3})^* \Omega_{IPGW,0}$ then IPGW # k 18 is an over-associated IPGW 18 in the total plan rate. $\theta_{IPGW,3}$ is a configurable parameter with default value, for example, of $\theta_{IPGW,3}=0.30$. The range of $\theta_{IPGW,3}$ is [0, 10] with step size=0.01.

In the case that the IPGW # k 18 is determined to be an over-associated IPGW 18, the process 400 continues in a block 434. In the case that the IPGW # k 18 is not determined to be an over-associated IPGW 18, the process 400 continues in a block 436.

In the block 434, the terminal 12 determines whether the terminal 12 is currently associated with an IPGW 18. In the case that the terminal 12 is currently associated with an IPGW 18, the process continues in the block 438. In the case that the terminal is not currently associated with an IPGW 18, the process continues in the block 436.

In the block 436, the terminal 12 associates with the IPGW # k 18. Upon the terminal 12 associating with the IPGW # k 18, the process 400 ends.

In the block 438, which follows from the block 434, the terminal 12 maintains its association with the current IPGW 18. The process 400 ends.

Figure 5:
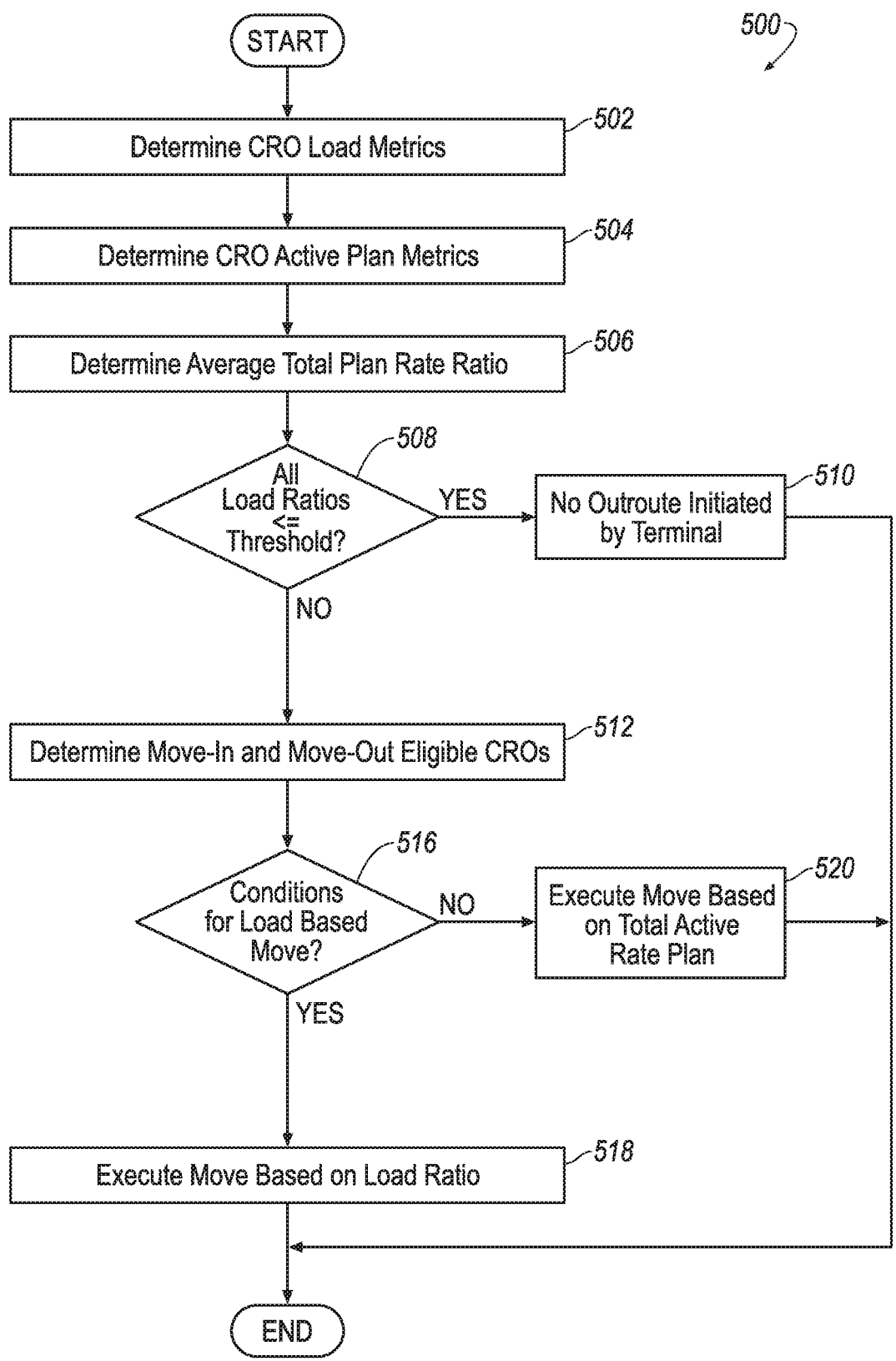
FIG. 5 is a diagram of an exemplary process for adjusting load balancing of a network during network congestion.

FIG. 5 is a diagram of an exemplary process 500 for adjusting load balancing of a network during network congestion. The process 500 starts in a block 502.

In the block 502, a computing device, for example, the terminal 12, and/or the bandwidth manager 21 determine CRO 20 load metrics.

Suppose there are N CRO 20s. The respective estimated non-real-time (NRT) capacity is $C_i$, i=1, . . . , N, with equivalent symbol rate $S_i$, i=1, . . . , N. $S_i$ may be the full symbol rate of a spectrum or a portion of symbol rate at a wideband spectrum. When multiple CROs 20 share one outroute 22, each uses a dedicated portion of the symbol rate.

The average load $r_0$ for multiple CROs 20 at time t can be obtained by $$r_0(t) = \frac{\sum_{i=1}^{N} D_i(t)}{\sum_{i=1}^{N} C_i(t)}, \qquad \text{Eqn. 41}$$

where $D_i$ is the total reported backlog of CRO # i 20, i=1, . . . , N.

The difference between the average load and an individual CRO 20 load is $$\Delta r_i = r_i - r_0, i=1, \ldots, N. \qquad \text{Eqn. 42}$$

If $\Delta r_i > 0$, the CRO 20 may have higher than average load level; otherwise, its load level is lower than the average.

Upon determining the CRO 20 load metrics, the process 500 continues in a block 504.

In the block 504, a computing device, for example, the terminal 12, and/or the bandwidth manager 21, determines CRO 20 Active Plan Metrics.

The average active plan rate ratio $\psi_0(t)$ is defined as $$\psi_0(t) = \frac{\sum_{i=1}^{N} R_i(t)}{\sum_{i=1}^{N} C_i(t)}, \qquad \text{Eqn. 43}$$

where $R_i$ is the total weighted plan rate of active terminals for CRO # i 20, i=1, ..., N.

The difference between the average active plan ratio and that of an individual CRO 20 is $$\Delta\psi_i = \psi_i - \psi_0, i=1, \ldots, N. \qquad \text{Eqn. 44}$$

If $\Delta\psi_i > 0$, the CRO 20 may have higher than average active rate plan ratio; otherwise, its ratio is lower than the average.

Upon defining the CRO 20 active plan metrics, the process 500 continues in a block 506.

In the block 506, a computing device, for example, the terminal 12, and/or the bandwidth manager 21, determines the total plan rate ratio.

The average total plan rate ratio $\Omega_0(t)$ is defined as $$\Omega_0(t) = \frac{\sum_{i=1}^{N} U_i(t)}{\sum_{i=1}^{N} C_i(t)}, \qquad \text{Eqn. 45}$$

where $U_i$ is the total weighted plan rate of all terminals associated for CRO # i 20, i=1, ..., N.

The load metrics can be used to determine whether a terminal 12 needs to perform an outroute 22 move, and if so where to move.

It can be seen that if all load ratios are smaller than 1, i.e., $r_i < 1$, i=1, ..., N, then the first network 11 is uncongested. There is no need for a terminal to switch CRO 20. But if any single CRO 20 runs into congestion, there would be a need to do load balancing.

Upon determining the average plan rate ratio, the process 500 continues in a block 508.

In the block 508, the process 500 determines whether all load ratios are less than or equal to a predetermined threshold. In the case that all $r_i \leq \theta_1$, i=1, ..., N, no outroute 22 move initiated by the terminal 12. The default value may be, for example, $\theta_1 = 1.25$. The process 500 continues in a block 510.

In the case that not all $r_i \leq \theta_1$, i=1, ..., N, the process 500 continues in a block 512.

In the block 510, the terminal 12 determines, based on the determination that all load ratios are less than or equal to the predetermined threshold, that no outroute 22 move should be initiated by the terminal 12. The process 500 ends.

In the block 512, a computing device, for example, the terminal 12, and/or the bandwidth manager 21, determines move-in and move-out eligible CROs 20.

The terminal 12 evaluates CROs 20 in a resource pool 30. In the case that the load or plan rate level of a CRO 20 is less than or equal to a value based on the respective average load or average plan rate, as described above, the CRO 20 is determined by the terminal 12 to be eligible for move-in. In the case that the load or plan rate level of the CRO 20 is greater than a value based on the respective average load or average plan rate, the CRO 20 is determined to be eligible for move-out.

The procedure based on load is described as follows.
For CRO # i 20, i=1, ..., N,
if $r_i > r_0(1+\gamma_1)$, then $i \in Z_{load}^+$, where $Z_{load}^+$ is the set that is eligible for move-out based on load, namely load surplus set;
if $r_i < r_0(1-\gamma_2)$, then $i \in Z_{load}^-$, where $Z_{load}^-$ is the set that is eligible for move-in based on load, namely load deficit set.

$\gamma_1$ and $\gamma_2$ are configuration parameters. There could be some CROs 20 that are not in both.

Similar logic is used in plan rate based load balancing. The procedure is as follows.
For CRO # i 20, i=1, ..., N,
if $\psi_i > \psi_0(1+\gamma_1)$, then $i \in Z_{plan}^+$, where $Z_{plan}^+$ is the set that is eligible for move-out based on plan rate, namely plan rate surplus set;
if $\psi_i < \psi_0(1-\gamma_2)$, then $i \in Z_{plan}^-$, where $Z_{plan}^-$ is the set that is eligible for move-in based on load, namely load deficit set.

The values of the configured parameters may be, for example, $\gamma_1 = 0.1$ and $\gamma_2 = 0.1$. There could be some CROs 20 that are not in both.

Upon determining the Move-in eligible CROs 20 based on load, the move-out eligible CROs 20 based on plan, the move-in eligible CROs 20 based on plan and the move-out eligible CROs 20 based on plan, the process 500 continues in a block 516.

In the block 516, a computing device, for example, the terminal 12, and/or the bandwidth manager 21, determines whether any CRO 20's load ratio is larger than the threshold (as described with respect to block 508) and the average load ratio is smaller than a configuration, i.e., if any $r_i > \theta_1$ and $r_0 \leq \theta_2$, i=1, ..., N, the process 500 continues in a block 518. Otherwise, the process 500 continues in a block 520.

In the block 518, a computing device, for example, the terminal 12, and/or the bandwidth manager 21, moves terminals 12 from a relatively overloaded CRO 20 to relatively underloaded CRO 20. The move is based on the load ratio.

The difference in load for $Z_{load}^-$ is $\Delta r_i \cdot C_i$, $i \in Z_{load}^-$, $C_i$ is the estimated non-real-time (NRT) capacity. For a terminal in $Z_{load}^+$, it has the possibility to go to any CRO in $Z_{load}^-$. A probability is defined so that the dynamic load balancing can be statistically achieved.

Thus, for a terminal 12 in a load surplus set, the probability that it moves into a certain load deficit set is $$P_i^{(load)} = \frac{\Delta r_i \cdot C_i}{\sum_{k=1}^{K} \Delta r_i \cdot C_i}, i, k \in Z_{load}^-, \qquad \text{Eqn. 46}$$

K is the number of items in $Z_{load}^-$.

For an eligible move-out terminal 12, a preconfigured move-out probability is applied to limit the perturbation of first network 11 load, denoted as P_move_out with a default value, for example, of 0.05.

A computing device, a computing device, for example, the terminal 12, and/or the bandwidth manager 21, then executes moves of terminals 12 from move-out eligible CROs 20 to move-in eligible CROs 20 based on the determined probabilities. Upon executing the moves, the process 500 ends.

In the block 520, the computing device moves terminals 12 from relatively heavily congested CROs 20 to relatively lightly congested CROs 20. In this case, the moves are based on the total active plan rate.

The difference in load for $Z_{plan}^-$ is $\Delta\psi_i \cdot C_i$, $i \in Z_{plan}^-$, $C_i$ is the estimated NRT capacity. For a terminal in $Z_{plan}^+$, it has possibility to go to any CRO 20 in $Z_{plan}^-$. A probability is defined so that the dynamic load balancing can be statistically achieved.

Thus, for a terminal in a load surplus set, the probability that it moves into a certain load deficit set is $$P_i^{(plan)} = \frac{\Delta \psi_i \cdot C_i}{\sum_{j=1}^{J} \Delta \psi_j \cdot C_j}, \quad i, j \in Z_{plan}^-, \quad \text{Eqn. 47}$$

$J$ is the number of items in $Z_{plan}^-$.

The computing device such as the terminal 12, and/or the bandwidth manager 21, then executes moves of terminals 12 from move-out eligible CROs 20 to move-in eligible CROs 20 based on the determined probabilities related to plan rate.

In both load based and plan rate based algorithms, because the CRO 20 move is for idle terminals 12, switching of the CRO 20 will not bring immediate change to the load level. A upper limit that somehow relies on the total number of terminals, no matter active or not, should be considered.

Thus, we can add a limitation on a move-in CRO 20, expressed as

If $\Omega_i > \Omega_0(1+\theta_3)$, i=1, . . . , N, then CRO # i 20 is a non-move-in CRO 20.

$\theta_3$ is a configuration parameter with default value, for example, of $\theta_3$=0.30.

Upon executing moves, based on one of loading or plan rate, the process 500 ends.

Figure 6A:
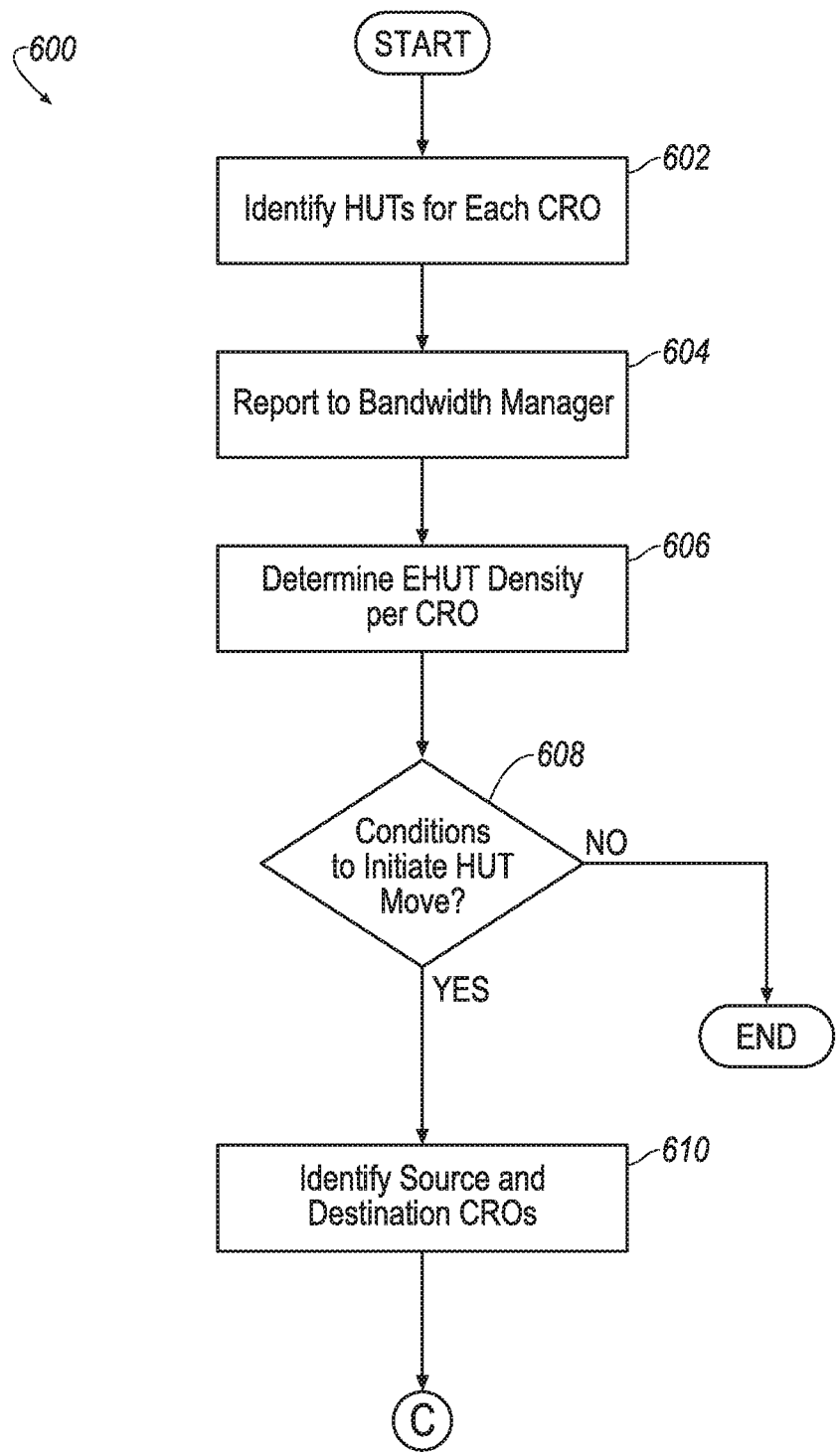
FIG. 6A is a diagram of a first portion of an exemplary process to adjust load balancing of active terminals.
Figure 6B:
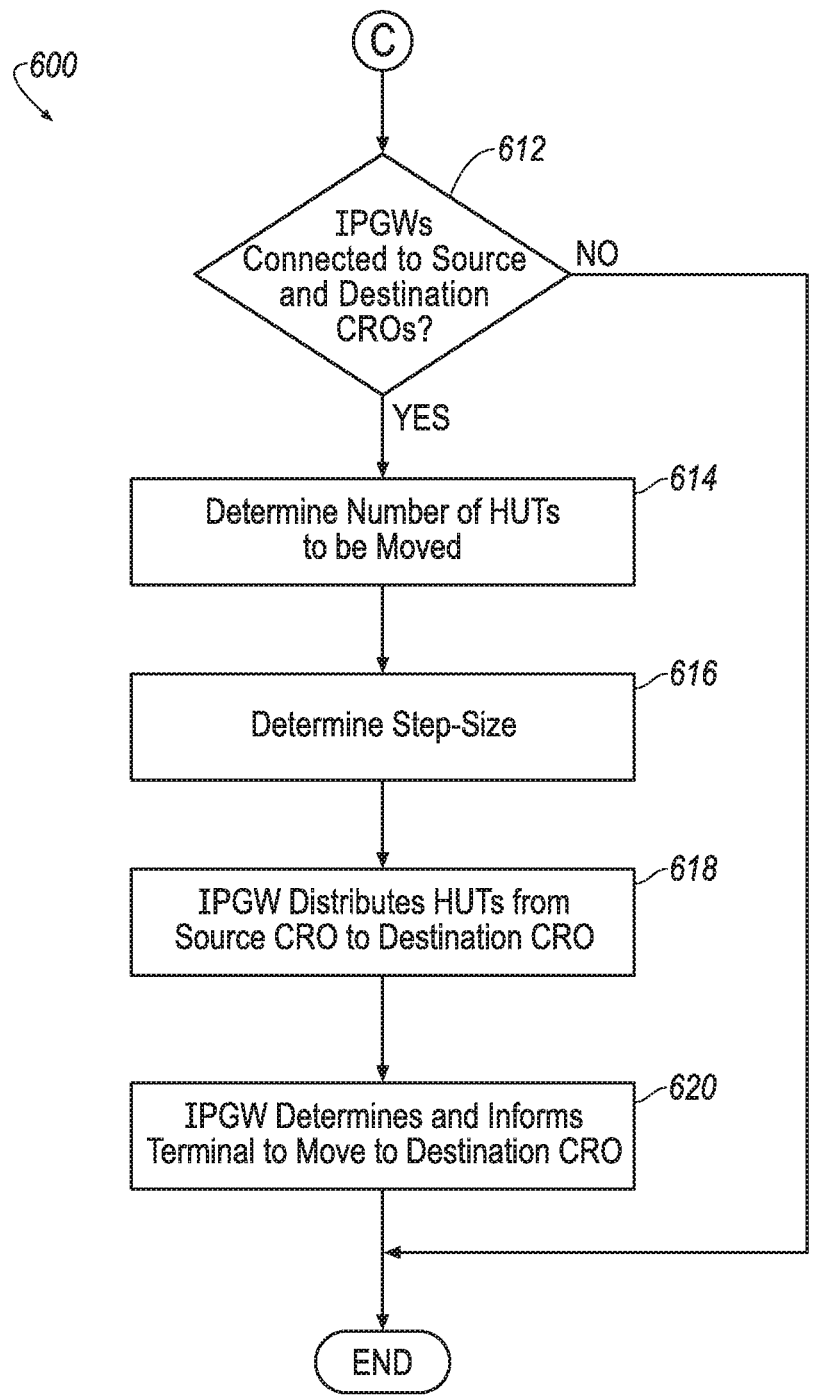
FIG. 6B is a diagram of a second portion of the exemplary process to adjust load balancing of active terminals.

FIG. 6 is a diagram of an exemplary process 600 for a computing device, e.g., a terminal 12, an IPGW 18 and/or a bandwidth manager 21, to adjust load balancing of active terminals 12.

The first network 11 changes the outroute 22 for selected terminals 12 based on backlog such that CRO 20 load balancing can be achieved (within a resource pool 30). This method targets the switching of active terminals 12 with a backlog, resulting in expected or immediate load change across CROs 20.

In the resource pool 30, there may be some terminals 12 that are frequently active in transmission with large backlogs, such as a video streaming user. These terminals 12 are referred to as highly active user terminals 12 (HUT 12). An uneven distribution of HUTs 12 can result in degraded quality of service (QoS) for users on an outroute 22 CRO 20 where the HUTs 12 are heavily located, including the HUTs 12. It would be desirable to balance HUTs 12 across outroute 22 CROs 20, especially when CROs 20 are unevenly loaded, even at the cost that ongoing service is disrupted.

A computing device e.g., a terminal 12, an IPGW 18 and/or a bandwidth manager 21, adjusts the load balancing of active terminals 12. The process 600 starts in a block 602.

In the block 602, the computing device, identifies highly active user terminals 12 (HUT 12) within the resource pool 30.

Suppose an IPGW 18 is connected to K CROs 20. The CRO 20 allocated bandwidth is denoted as $C_k(t)$ at time t, k=1, . . . , K. Let N be the active users with backlog at time t associated with this IPGW 18. Consider multiple rate plans. Let $R_0$ be the basic rate plan and $R_i$ be the rate plan for terminal i, i=1, . . . , N. Because terminals 12 may have different plan rates and assigned weights, it is convenient to normalize using the basic plan rate $R_0$.

Denote $N_0(t)$ the equivalent active terminals of basic plan at time t. Let $$m_i = \frac{R_i}{R_0},$$

i=1, . . . , N, then $m_i$ is the equivalent multiple of base plan rate for user i. We have $$N_0(t) = \sum_{i=1}^{N} w_i m_i. \quad \text{Eqn. 48}$$

Two exemplary methods of determining HUTs 12 are described below.

Method 1:

Let $t_0$ be the sampling interval, $T_{HUT}=n_h \cdot t_0$, where $n_h$ and $T_{HUT}$ are the number of intervals and period to determine a HUT 12, respectively. By default, for example, $t_0$=2 sec, and $n_h$=5.

At every $t_0$, the IPGW 18 evaluates the backlog of each terminal 12, determining a candidate list of HUT 12, based whether the existing backlog of a terminal 12 is larger than a predetermined threshold.

Let $q_i$ be the backlog size of terminal i, i=1, . . . , N. N is the number of terminals 12 with backlog at the evaluating time. Denote a threshold $q_{th}=k_0 R_0$, where $k_0$ is a configurable number (e.g., default $k_0$=1), and $R_0$ is the base plan rate in bytes/sec (or Mbps).

In a period $T_{HUT}$, for a sampling interval $t_k = k \cdot t_0$, k=1, . . . , $n_h$, a terminal 12 is considered to be a HUT 12 candidate if $q_i(t_k) > q_{th}$. Let $N_L$ be the upper limit of the candidate list. Resultantly there will be $n_h$ candidate lists with each list having no more than $N_L$ elements. Sort the number of occurrence of a terminal 12 in the lists in descending order. Then we shorten the sorted list by applying:

(1). Number of occurrence is no less than $\theta \cdot n_h$ (e.g., default $\theta$=0.70);

(2). The shortened sorted list has no more than $N_L$ elements. In the above, we break ties randomly.

Method 2:

With this method, the average throughput rate is evaluated for a terminal 12 every $T_{HUT}$ time. If the average throughput is larger than a threshold, the terminal 12 is considered as a HUT 12.

Specifically, let $A_i$ be the average throughput rate, i=1, . . . N, $V_i$ be the throughput volume in $T_{HUT}$, then $$A_i = \frac{V_i}{T_{HUT}}, \quad i = 1, \ldots, N. \quad \text{Eqn. 49}$$

If $A_i > A_{TH}$ (or $A_i > m_i A_{TH}$), then terminal 12 is a HUT 12. ($m_1$ is the ratio of user # i's rate plan and the base plan.)

The qualified HUTs 12 are also sorted in descending order and limited by $N_L$ elements, resulting in a sorted HUT 12 list with no more than $N_L$ elements.

When an IPGW 18 is connected to multiple CROs 20, the number of HUTs 12 should be evaluated for each CRO 20. The IPGW 18 also needs to send the number of HUTs 12 for each CRO 20 to the Bandwidth manager 21 for outroute load balancing purposes.

Either method 1 or method 2 may be used. However, in a case where complexity is not a concern, Method 1 may give a better indication of which terminals 12 are highly active, and therefore be preferred.

In a case that a terminal 12 is identified as a HUT 12, it would be convenient to express its activity relative to a base line plan. Suppose a base plan user with weight 1.0 is considered a base-plan HUT. Then a user i with plan rate $R_i$ and weight $w_i$ would be considered equivalent to $w_i m_i$ $$\left(m_i = \frac{R_i}{R_0}\right)$$

base-plan HUTs 12. For example, given a base plan 5 Mbps, a user with rate plan 10 Mbps and weight=2 would be equivalent to 4 base-plan HUTs 12.

We refer to a base-plan HUT 12 with weight 1.0 as Equivalent HUT (EHUT).

Upon identifying the HUTs 12 associated with each CRO 20, and, when required, expressing the activity of the in EHUTs, the process continues in a block 604.

In the block 604, a computing device, for example the IPGW 18, reports the identity of HUTs 12, to, for example, the bandwidth manager 21, for load balancing purposes. Upon sending the identity of the HUTs 12 to the bandwidth manager 21, the process 600 continues in a block 606.

In the block 606, a computing device, for example the bandwidth manager 21, determines the EHUT density per CRO 20.

Periodically, the bandwidth manager 21 receives a message from the IPGW 18 with the number of EHUTs for each CRO 20. Denote the total number of CROs 20 as M and total number of IPGWs 18 as N. Let $n_{ij}$ be the number of EHUTs for i-th CRO 20 and j-th IPGW 18, i=1, ..., M, j=1, ..., N. If an j-th IPGW 18 is not connected to a i-th CRO 20, the $n_{ij}$ is set to zero at the Bandwidth manager 21 (the IPGW 18 may not report a value).

The total number of EHUTs for an i-th CRO 20 is calculated by $$I_i = \sum_{j=1}^{N} a_{ij}, i = 1, \ldots, M,$$ Eqn. 50

M is the number of CROs.

EHUT Density:

HUT 12 density for a CROs 20 can be calculated as follows. Let $N_{i,EHUT}$ be the number of EHUTs in CRO # i 20, and $C_i$ is the capacity (in Mbps), i=1, ..., N. N is the number of CROs.

The EHUT density is given by $$\rho_i = \frac{N_{i,EHUT}}{C_i}, i = 1, \ldots, N.$$ Eqn. 51

The mean EHUT density can be found by $$\rho_{mean} = \frac{\sum_{i=1}^{N} N_{i,EHUT}}{\sum_{i=1}^{N} C_i}.$$ Eqn. 52

Upon determining the EHUT density for each CRO 20, the process 600 continues in a block 608.

In the block 608, the computer device determines whether the conditions are present for an IPGW 18 to initiate a HUT move. The conditions for initiating a HUT move include one or more CRO 20 load ratios exceeding the average CRO load ratio by a certain pre-determined threshold, and the average CRO load ratio exceeding a predetermined configuration threshold.

That is, if any $r_i > r_0(1+\varphi_{HUT-Load})$ and $r_0 > \theta_{HUT-Load}$, i=1, ..., M, both $\varphi_{HUT-Load}$ and $\theta_{HUT-Load}$ are configurable, we allow active terminals (i.e., HUTs) to move from a relatively overload CRO to relatively underload CRO. The default values may be, for example, $\varphi_{HUT}$=0.20 and $\theta_{HUT}$=2.0 or 2.5.

In the case that the bandwidth generator 21 determines that the conditions are present for the IPGW 18 to initiate a HUT move, the process 600 continues in a block 610. Otherwise, the process 600 ends.

In the block 610, the computing device identifies potential source and destination CROs 20.

The computing device identifies a CRO 20 as a potential source CRO 20 when both the load density $r_i > r_0(1+\varphi_{Load, upper})$ and EHUT density $\rho_i > \rho_{mean}(1+\varphi_{EHUT, upper})$, i=1, ..., M, M is the number of CROs, then CRO # i is a candidate Source CRO. $\varphi_{EHUT}$ is configurable, with a default value of, for example, $\varphi_{EHUT, upper}$=0.2.

This can be expressed as

Source CRO ID set=IDs of $[r_i : r_i > r_0(1+\varphi_{Load, upper})$ and $\rho_i > \rho_{mean}(1+\varphi_{EHUT, upper}), i=1, \ldots, M]$.

The computing device identifies a CRO 20 as a potential destination CRO 20 when both the load density $r_i < r_0(1-\varphi_{Load, lower})$ and EHUT density $\rho_i > \rho_{mean}(1-\varphi_{EHUT, lower})$, i=1, ..., M, M is the number of CROs, the CRO # i 20 is a candidate Destination CRO.

This can be expressed as

Destination CRO set=IDs of $[r_i : r_i < r_0(1-\varphi_{Load, lower})$ and $\rho_i < \rho_{mean}(1-\varphi_{EHUT, lower}), i=1, \ldots, M]$.

Independently, if some CROs 20 have much higher utilization while some other have much lower utilization, for example, one CRO has utilization of 95% and another 85%, then the network should initiate the move of active terminals from the CRO of much higher utilization to that of much lower utilization. The high utilization CRO would be the Source CRO and the low utilization CRO the Destination CRO.

The high and low utilization thresholds, denoted by $u_{HUT,high}$ and $u_{HUT,low}$, are $u_{HUT,high}$=0.95 $u_{HUT,low}$=0.85, respectively.

We refer the utilization based CRO move to as the First Condition of Active CRO Move and the load based as the Second Condition of Active Move. The First Condition is defined to have higher priority than the Second Condition.

In summary, the procedure may be written as follows:

---

IF the First Condition is ON, THEN
    Source CRO ID set = IDs of [ $u_i : u_i > u_{HUT, high}$ , i = 1,..., N].
    Destination CRO ID set = IDs of [ $u_i : u_i < u_{HUT, low}$ , i = 1,..., N].
    IF both Source CRO set and Destination CRO set are not empty, then EXIT (with Source and Destination CRO IDs);
    Else (% i.e., First Condition is OFF or at least one set is empty)
    % check the Second Condition
    IF the Second Condition is ON AND Overall CRO backlog density is larger than a threshold (i.e. $r_0 > \theta_{HUT-Load}$),
    THEN
        Source CRO ID set = IDs of [ $r_i : r_i > r_0(1 + \varphi_{Load, upper})$ and $\rho_i > \rho_{mean}(1 + \varphi_{EHUT, upper})$ , i = 1,..., N].
        Destination CRO set = IDs of [ $r_i : r_i < r_0(1 - \varphi_{Load, lower})$ and $\rho_i < \rho_{mean}(1 - \varphi_{EHUT, lower})$ , i = 1,..., N].
    END
END Upon determining potential source and destination CROs 20, the process 600 continues in a block 612.

In the block 612, the process 600 determines whether an IPGW 18 has connections to both the potential source CRO 20 and the potential destination CRO 20.

A matrix can be defined to record which IPGW 18 is connected which CRO 20.

Given M CROs 20 and N IPGWs 18, a M×N matrix is defined with each element is either 1 or 0. Refer to this matrix is a connection matrix, denoted as $H=\{h_{ij}\}_{M\times N}$. If CRO 20 i is connected to IPGW 18 j, $h_{ij}=1$; otherwise, $h_{ij}=0$.

For example, there are three IPGWs 18 and two CROs 20. If each CRO 20 is connected to every IPGW 18, then we have $$H = \{h_{ij}\}_{2\times 3} = \begin{bmatrix} 1 & 1 & 1 \\ 1 & 1 & 1 \end{bmatrix}. \quad \text{Eqn. 53}$$

Figure 7:
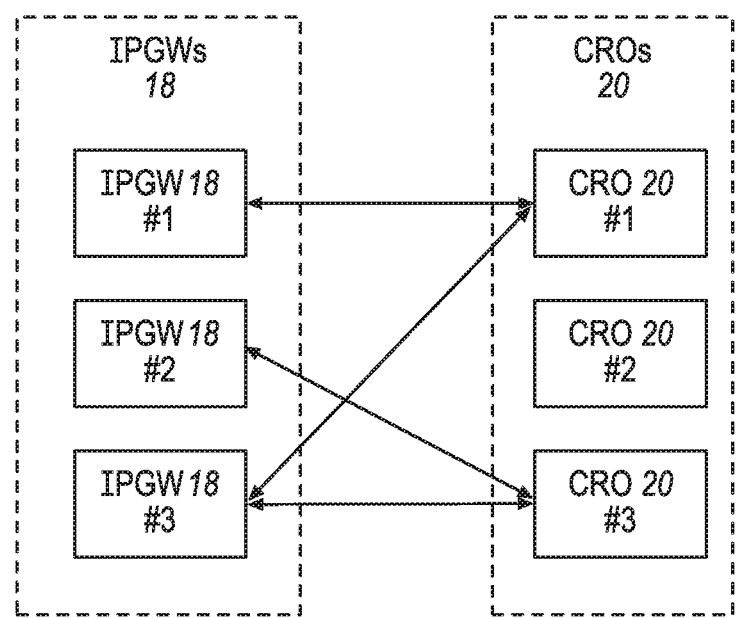
FIG. 7 is a diagram of example connections between IPGWs with CROs in a resource pool.

If we have connections as shown in FIG. 7, we will have $$H = \{h_{ij}\}_{2\times 3} = \begin{bmatrix} 1 & 0 & 1 \\ 0 & 1 & 1 \end{bmatrix}. \quad \text{Eqn. 54}$$

Source and Destination CROs 20 can be identified, as described above. The computing device can determine whether the identified source and destination CROs 20 are connected to at least one IPGW 18 according to the following method.

Denote a column indicating vector I (size N×1) with N elements, where N is the number of CROs 20. We use 1, −1 and 0 to mark a Source, a Destination and neither, respectively. Suppose there are 4 CROs 20. Vector $I=[110-1]^T$ means CROs #1 and #2 are the Source CRO, CRO #4 is the Destination CRO, and CRO #3 is neither. Because I and the column vector of connection matrix H have the same size, we apply I to each column vector of H to obtain a new vector of element products column by column.

For example, let $$I = \begin{bmatrix} 1 \\ 1 \\ 0 \\ -1 \end{bmatrix}, \text{ and } H = \begin{bmatrix} 1 & 0 & 1 & 1 & 0 \\ 0 & 1 & 0 & 0 & 0 \\ 0 & 1 & 0 & 1 & 0 \\ 1 & 0 & 1 & 0 & 1 \end{bmatrix}. \quad \text{Eqns. 55, 56}$$

Multiplying vector I with column vectors in H, we obtain a Connection Indication matrix for Source-Destination on IPGWs. Denote such matrix as $H_{SD}$.

Then in this example, we have $$H_{SD} = \begin{bmatrix} 1 & 0 & 1 & 1 & 0 \\ 0 & 1 & 0 & 0 & 0 \\ 0 & 0 & 0 & 0 & 0 \\ -1 & 0 & -1 & 0 & -1 \end{bmatrix}. \quad \text{Eqn. 57}$$

In this example, column 1 of $H_{SD}$ means IPGW #1 is connected to Source CRO #1 to Destination CRO #4. Column 2 means IPGW #2 only is only connected to Source CRO #2, not connected to any Destination CRO.

Alternatively, we can also use a diagonal indication matrix (elements except diagonal must be 0) for Source and Destination CROs. In above example, vector I can be replaced by a diagonal matrix $D_I$, $$D_I = \begin{bmatrix} 1 & 0 & 0 & 0 \\ 0 & 1 & 0 & 0 \\ 0 & 0 & 0 & 0 \\ 0 & 0 & 0 & -1 \end{bmatrix}. \quad \text{Eqn. 58}$$

The Connection Indication matrix $H_{SD}$ can also be obtained by $$H_{SD} = D_I \times H = \begin{bmatrix} 1 & 0 & 0 & 0 \\ 0 & 1 & 0 & 0 \\ 0 & 0 & 0 & 0 \\ 0 & 0 & 0 & -1 \end{bmatrix} \times \begin{bmatrix} 1 & 0 & 1 & 1 & 0 \\ 0 & 1 & 0 & 0 & 0 \\ 0 & 1 & 0 & 1 & 0 \\ 1 & 0 & 1 & 0 & 1 \end{bmatrix} = \quad \text{Eqn. 59}$$

$$\begin{bmatrix} 1 & 0 & 1 & 1 & 0 \\ 0 & 1 & 0 & 0 & 0 \\ 0 & 0 & 0 & 0 & 0 \\ -1 & 0 & -1 & 0 & -1 \end{bmatrix}.$$

Given $H_{SD}$, we evaluate each column vector of it, as long as elements of opposite signs exist, meaning an IPGW 18 is connected to both a Source CRO 20 and a Destination CRO 20, an outroute 22 move of HUTs 12 would be allowed. In the case that the computing device determines that an IPGW 18 is connected to both the Source CRO 20 and the Destination CRO 20, the process 600 continues in a block 614. Otherwise, the process 600 ends.

In the block 614, the computing device determines the number of HUTs to be moved from the Source CRO 20 to the Destination CRO 20.

A variable or a fixed amount of moves can be used. This is referred to as step-size of outroute move. The step size can be variable or fixed. If it is variable, the bandwidth manger 21 determines its value. If it is fixed, it can be configured in IPGWs 18 by the first network 11.

Based on the duration of completing an outroute move, the bandwidth manager 21 may be programmed to select a fixed step-size. The step-size may be denoted as $\Delta_{EHUT}$. The default value may be set, for example, as $\Delta_{EHUT}=2\%$ (0.02). Upon determining the step-size, the process 600 continues in a block 616.

In the block 616, the bandwidth manager 21 transmits data related to source CROs 20, destination CROs 20, step-size, etc., to one or more IPGWs 18. Upon transmitting the information to the IPGWs 18, the process 600 continues in a block 618.

In the block 618, the IPGW 18 distributes HUTs 12 from source CROs 20 to destination CROs 20.

For a particular IPGW 18, suppose there are $N_S$ and $N_D$ Source and Destination CROs, respectively. The number of EHUTs in the Source CROs is $a_i$, i=1, . . . , $N_S$. The moving-out EHUTs from CRO # i 20 would be $\Delta_i = \Delta_{EHUT} \cdot a_i$ (not necessarily an integer). As described above, a sorted list of HUTs 12 for each CRO 20 in this IPGW 18 was previously determined. Starting from the top of the list, we select the moving-out users based on their EHUTs. The number of EHUTs of each user is deducted from $\Delta_i$ until $\Delta_i$ is used up. Rounding-up is used if needed.

The selected moving-out users are then randomly assigned to each destination CRO 20 with even opportunity.

Upon distributing HUTs 12 from source CROs 20 to destination CROs 20, the process 600 continues in a block 620.

In the block 620, the IPGW 18 determines and informs the terminal 12 to move to a destination CRO 20.

For example, the IPGW 18 may start distributing HUTs 12 from the top of the list of HUTs 12 for each CRO 20 in the IPGW 18, based on their EHUTs, and continue to work down the list. However, in the case that a particular HUT 12 rejects a move, for example, due to certain reasons such as a VOIP user with concurrent streaming, that the IPGW 18 may repeatedly select the same rejected HUT 12.

An alternative exemplary method is that a cut-off set is chosen from the top of the list, for example, $L_{0,HUT}$ HUT 12 users. $L_{0,HUT}$ is configurable (ADV) with default value, for example, of $L_{0,HUT}=20$. The actual cut-off set size $L_{HUT}=\min(L_{0,HUT}$ size of the list). The IPGW 18 then picks up users one by one randomly from the cut-off set. The number of EHUTs of each user is deducted from $\Delta_i$ until $\Delta_i$ is used up or the cut-off set is empty. Rounding-up is used if needed. (Selected terminals 12 may not be duplicated.)

The selected moving-out users are then randomly assigned to each Destination CRO 20 with even opportunity. Upon assigning the cut-off set of HUTs 12 from source CROs 20 to destination CROs 20, the process 600 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A first terminal device in a first network, the first terminal device including a processor and a memory, the memory storing instructions such that the processor is programmed to:

receive first data indicating a respective first loading of each of two or more first level access devices in a resource pool in the first network;

select a first level access device from the plurality of first level access devices based at least in part on the first data; and communicate with a second network via the selected first level access device and a second level access device selected from two or more second level access devices in the resource pool in the first network;

wherein:

communication between the first terminal device and the second network can be established in the first network by a combination of any one of the two more first level access devices in the resource pool and any one of the two or more second level access devices in the resource pool; and each of the first level access devices in the resource pool is switchable to communicate with the first terminal via at least a respective one of one or more shared access channels.

2. The first terminal device of claim 1, wherein the processor is further programmed to:

select, prior to selecting the first level access device, the second level access device, wherein the first level access device is selected without changing the selected second level access device.

3. The first terminal device of claim 1, wherein the processor is further programmed to:

determine, prior to selecting the first level access device, that the first terminal device has been inactive for a predetermined period of time, wherein selecting the first level access device is based at least in part on the determination that the first terminal device has been inactive for the predetermined period of time.

4. The first terminal device of claim 1, wherein the processor is further programmed to:

receive second data indicating a respective second loading of each of the two or more second level access devices; and select the second level access device based at least in part on the second data.

5. The first terminal device of claim 1, wherein the processor is further programmed to:

determine, based on the first data, an average of a first level device loading over all of the plurality of first level devices, wherein the selection of the first level device is based at least in part on the determination of an average of the first level device loading over all of the plurality of first level devices.

6. The first terminal device of claim 5, wherein the processor is further programmed to:

determine that the average of the first level device loading over all of the plurality of first level devices is greater than a predetermined threshold, wherein the selection of the first level device is based at least in part on the determination that the average of the first level device loading over all of the plurality of first level devices is greater than the predetermined threshold.

7. The first terminal device of claim 1, wherein the processor is further programmed to:

select the second level device based on a default condition.

8. The first terminal device of claim 1, wherein the processor is further programmed to:

receive third data indicating a respective utilization of each of the two or more second level devices in the resource pool;

determine a utilization of the selected second level device based at least in part on the third data;

determine an overall average utilization of the two or more second level devices in the resource pool based at least in part on the third data;

compare the utilization of the selected second level device to the overall average utilization of the two or more second level devices; and select a second level device based at least in part on the comparison.

9. The first terminal device of claim 1, wherein the processor is further programmed to:

receive fourth data indicating a respective utilization of each of the two or more first level devices in the resource pool;

identify one or more pairs of a first level device in the resource pool communicatively coupled with a second level device in the resource pool;

determine, based on the fourth data, a respective utilization for each of the one or more identified pairs of the respective first level device and the respective second level device; and select the first level device based at least in part on the determined utilizations for each of the one or more pairs of the respective first level device and the respective second level device.

10. The first terminal device of claim 1, wherein the processor is further programmed to:

determine a sum of an assigned data rate for each of one or more terminal devices including the first terminal device; and select the first level device based at least in part on the determined sum of the assigned data rates for each of the one or more terminal devices including the first terminal device.

11. The first terminal device of claim 10, wherein the assigned data rate is based on rate plans associated respectively with each of the one or more terminal devices including the first terminal device.

12. A bandwidth management computing device in a first network, the bandwidth management computing device including a processor and a memory, the memory storing instructions such that the processor is programmed to:

receive first data indicating a respective loading of each of two or more first level access devices in a resource pool in the first network at a time;

determine, based on the first data, an average loading over all of the two or more first level access devices in the resource pool at the time;

identify, based in part on the average loading over all of the two or more first level access devices at the time, a first threshold;

determine that a loading of a first first level access device is greater than the first threshold at the time; and based on the determination that the loading of the first first level device is greater than the first threshold, instruct a first terminal device associated with the first first level device to switch from the first first level access device to a second first level access device;

wherein:

communication between the first terminal device and the second network can be established in the first network by a combination of any one of the two more first level access devices in the resource pool and any one of the two or more second level access devices in the resource pool; and each of the first level access devices is switchable to communicate with the first terminal via at least a respective one of one or more shared access channels.

13. The bandwidth management computing device of claim 12, wherein the average loading over the two or more first level devices in the resource pool is based at least in part on a reported backlog for each of the two or more first level devices at the time.

14. The bandwidth management computing device of claim 12, wherein the processor is further programmed to:

determine, prior to instructing the first terminal to switch from the first first level access device to the second first level access device, that the average loading over the two or more first level access devices in the resource pool is less than a second threshold; and instructing the first terminal to switch from the first first level access device to the second first level access device based at least in part on the determination that the average over all loading is less than the second threshold.

15. The bandwidth management computing device of claim 12, wherein the processor is further programmed to:
identify, based in part on the average loading over the two or more first level access devices in the resource pool at the time, a third threshold;
determine that a loading of a second first level device is less than the third threshold, wherein, the first terminal is instructed to switch to the second first level access device based at least in part on the determination that the loading of the second first level access device is less than the third threshold.

16. The bandwidth management computing device of claim 12, wherein the processor is further programmed to:
determine an average weighted rate plan over the two or more first level access devices in the resource pool at the time;
identify, based at least in part on the average weighted rate plan, a fourth threshold;
determine that a weighted rate plan of a third first level device is greater than the fourth threshold; and
based at least in part on the determination that the loading of the third first level device is greater than the fourth threshold, instruct a second terminal associated with the third first level device to switch to another first level device.

17. The bandwidth management computing device of claim 16, wherein the processor is further programmed to:
determine that a loading of a fourth first level device is less than a fifth threshold, wherein, the second terminal is instructed to switch from the third first level access device to the fourth first level access device.

18. The bandwidth management computing device of claim 16, wherein the processor is further programmed to:
determine, prior to instructing the second terminal to switch, that no first level device in the resource pool has a loading greater than the first threshold.

19. The bandwidth management computing device of claim 16, wherein the processor is further programmed to:
determine that the average loading over the two or more first level access devices in the resource pool at the time is less than a sixth threshold; wherein instructing the second terminal associated with the third first level device to switch to another first level device is based at least in part on the determination that the average loading over the two or more first level access devices in the resource pool at the time is less than the sixth threshold.

20. A first second level access device in a first network, the first second level access device including a processor and a memory, the memory storing instructions such that the processor is programmed to:
receive first data indicating an activity level of each of one or more terminal devices for a time period;
identify, a target data rate threshold;
determine, based on the first data, that the activity level of a first terminal device of the one or more terminal devices connected to a first first level access device is greater than the target data rate threshold for the time period; and
based on the determination that the activity level of the first terminal device is greater than the target data rate threshold for the time period, instruct the first terminal device to switch from the first first level access device to a second first level access device;
wherein each of two or more first level access devices is switchable to communicate with the first terminal via at least a respective one of one or more shared access channels; and
further wherein each of one or more second level access devices is switchable to independently communicatively couple one or more of the two or more first level access devices with a second network.

21. The first second level access device of claim 20, wherein the target rate threshold is based at least in part on a base plan rate.

22. The first second level access device of claim 20, wherein the first data indicating the activity level includes at least one of a respective backlog and a respective throughput of each of the one or more terminal devices for the time period.

23. The first second level access device of claim 20, wherein the processor is further programmed to:
identify a respective number of terminal devices associated with each of the first level access devices with an activity level greater than the target data rate threshold;
determine, based on the respective number of terminal devices with an activity level greater than the target data rate threshold associated with each of the first level access devices, a target number of terminal devices with an activity level greater than the target data rate to be associated with each of the first level access devices; and
instruct one or more terminal devices with an activity level greater than the target data rate threshold associated with each of the first level access devices to switch from a third first level access device to a fourth first level access device, wherein the third first level access device is associated with more than the target number of high activity terminal devices prior to the switch, and the fourth first level access device is associated with less than the target number of high activity terminal devices prior to the switch.

24. The first second level access device of claim 23, wherein the processor is further programmed to:
determine a normalized activity level for each of the terminal devices with an activity level greater than the target activity level; wherein instructing the one or more terminal devices to switch from the third first level access device to the fourth first level access device is based at least in part on the normalized activity levels for the respective terminal devices.

25. The first second level access device of claim 23, wherein the third first level device and the fourth first level device are associated with the first second level device.

26. The first second level access device of claim 20, wherein a number of terminal devices moved during a move time period is less than a predetermined threshold.

* * * * *

UNITED STATES PATENT AND TRADEMARK OFFICE
CERTIFICATE OF CORRECTION

PATENT NO. : 10,812,389 B2
APPLICATION NO. : 15/199629
DATED : October 20, 2020
INVENTOR(S) : Jun Xu et al.

Page 1 of 1

It is certified that error appears in the above-identified patent and that said Letters Patent is hereby corrected as shown below:

In the Claims

Column 28, in Lines 66-67, replace "one of the two more first" with -- one of the two or more first --.

Column 30, in Line 51, replace "one of the two more first" with -- one of the two or more first --.

Signed and Sealed this
Fifth Day of January, 2021

Andrei Iancu
*Director of the United States Patent and Trademark Office*